US012750188B2

(12) United States Patent
Zewail et al.

(10) Patent No.: US 12,750,188 B2
(45) Date of Patent: Sep. 29, 2026

(54) SHARED DEMODULATION REFERENCE SIGNAL FOR PHYSICAL DOWNLINK CONTROL CHANNEL AND PHYSICAL DOWNLINK SHARED CHANNEL TRANSMISSIONS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 543 days.

(21) Appl. No.: 18/363,483

(22) Filed: Aug. 1, 2023

(65) Prior Publication Data

US 2025/0047440 A1 Feb. 6, 2025

(51) Int. Cl.
*H04L 5/00* (2006.01)
*H04L 25/02* (2006.01)
*H04W 72/1273* (2023.01)
*H04W 72/232* (2023.01)

(52) U.S. Cl.
CPC ........ *H04L 5/0051* (2013.01); *H04L 25/0238* (2013.01); *H04W 72/1273* (2013.01); *H04W 72/232* (2023.01)

(58) Field of Classification Search
None
See application file for complete search history.

(56) References Cited

U.S. PATENT DOCUMENTS

2012/0250642 A1* 10/2012 Qu ........................ H04W 24/10 370/329
2017/0339454 A1 11/2017 Meng et al.
2018/0145818 A1* 5/2018 Choi ........................ H04L 5/023
2018/0160361 A1* 6/2018 Yi ........................ H04L 5/0053
2019/0349158 A1* 11/2019 Wang ........................ H04W 4/027
2020/0077432 A1 3/2020 Xiong et al.
2022/0078767 A1* 3/2022 Xiong ........................ H04L 5/0053

FOREIGN PATENT DOCUMENTS

DE 102021110664 A1 10/2021

OTHER PUBLICATIONS

International Search Report and Written Opinion—PCT/US2024/032640—ISA/EPO—Sep. 18, 2024.

* cited by examiner

*Primary Examiner* — Clemence S Han
(74) *Attorney, Agent, or Firm* — Polsinelli

(57) ABSTRACT

Systems and techniques are provided for wireless communications. A process can include receiving a configured shared demodulation reference signal (DMRS) and determining, based on the configured shared DMRS, blind channel estimation information. The process can include receiving, based on the blind channel estimation information, control information indicative of a scheduled downlink data transmission. The process can include receiving, based on the blind channel estimation information, the scheduled downlink data transmission, wherein the scheduled downlink data transmission is received based on the control information and using the blind channel estimation information corresponding to the configured shared DMRS.

24 Claims, 12 Drawing Sheets

SHARED DEMODULATION REFERENCE SIGNAL FOR PHYSICAL DOWNLINK CONTROL CHANNEL AND PHYSICAL DOWNLINK SHARED CHANNEL TRANSMISSIONS

FIELD

Aspects of the present disclosure generally relate to wireless communication. In some implementations, examples are described for a shared demodulation reference signal (DMRS) for physical downlink control channel (PDCCH) and physical downlink shared channel (PDSCH) transmissions.

BACKGROUND

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method of wireless communication is provided, comprising: receiving a configured shared demodulation reference signal (DMRS); determining, based on the configured shared DMRS, blind channel estimation information; receiving, based on the blind channel estimation information, control information indicative of a scheduled downlink data transmission; and receiving, based on the blind channel estimation information, the scheduled downlink data transmission, wherein the scheduled downlink data transmission is received based on the control information and using the blind channel estimation information corresponding to the configured shared DMRS.

In another illustrative example, an apparatus of a network entity for wireless communication is provided. The apparatus includes at least one memory and at least one processor coupled to the at least one memory and configured to: receive a configured shared demodulation reference signal (DMRS); determine, based on the configured shared DMRS, blind channel estimation information; receive, based on the blind channel estimation information, control information indicative of a scheduled downlink data transmission; and receive, based on the blind channel estimation information, the scheduled downlink data transmission, wherein the scheduled downlink data transmission is received based on the control information and using the blind channel estimation information corresponding to the configured shared DMRS.

In another illustrative example, a non-transitory computer-readable storage medium comprising instructions stored thereon which, when executed by at least one processor, causes the at least one processor to: receive a configured shared demodulation reference signal (DMRS); determine, based on the configured shared DMRS, blind channel estimation information; receive, based on the blind channel estimation information, control information indicative of a scheduled downlink data transmission; and receive, based on the blind channel estimation information, the scheduled downlink data transmission, wherein the scheduled downlink data transmission is received based on the control information and using the blind channel estimation information corresponding to the configured shared DMRS.

In another illustrative example, an apparatus is provided for wireless communication. The apparatus includes: means for receiving a configured shared demodulation reference signal (DMRS); means for determining, based on the configured shared DMRS, blind channel estimation information; means for receiving, based on the blind channel estimation information, control information indicative of a scheduled downlink data transmission; and means for receiving, based on the blind channel estimation information, the scheduled downlink data transmission, wherein the scheduled downlink data transmission is received based on the control information and using the blind channel estimation information corresponding to the configured shared DMRS.

According to at least one illustrative example, a method of wireless communications at a network entity is provided, comprising: transmitting a configured shared demodulation reference signal (DMRS); transmitting control information indicative of a scheduled downlink data transmission, wherein the control information is modulated based on the configured shared DMRS; and transmitting the scheduled downlink data transmission, wherein the scheduled downlink data transmission is modulated based on the configured shared DMRS.

In another illustrative example, an apparatus of a network entity for wireless communication is provided. The apparatus includes at least one memory and at least one processor coupled to the at least one memory and configured to: transmit a configured shared demodulation reference signal (DMRS); transmit control information indicative of a scheduled downlink data transmission, wherein the control information is modulated based on the configured shared DMRS; and transmit the scheduled downlink data transmission, wherein the scheduled downlink data transmission is modulated based on the configured shared DMRS.

In another illustrative example, a non-transitory computer-readable storage medium comprising instructions stored thereon which, when executed by at least one processor, causes the at least one processor to: transmit a configured shared demodulation reference signal (DMRS); transmit control information indicative of a scheduled downlink data transmission, wherein the control information is modulated based on the configured shared DMRS; and transmit the scheduled downlink data transmission, wherein the scheduled downlink data transmission is modulated based on the configured shared DMRS.

In another illustrative example, an apparatus is provided for wireless communication. The apparatus includes: means for transmitting a configured shared demodulation reference signal (DMRS); means for transmitting control information indicative of a scheduled downlink data transmission, wherein the control information is modulated based on the configured shared DMRS; and means for transmitting the scheduled downlink data transmission, wherein the scheduled downlink data transmission is modulated based on the configured shared DMRS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
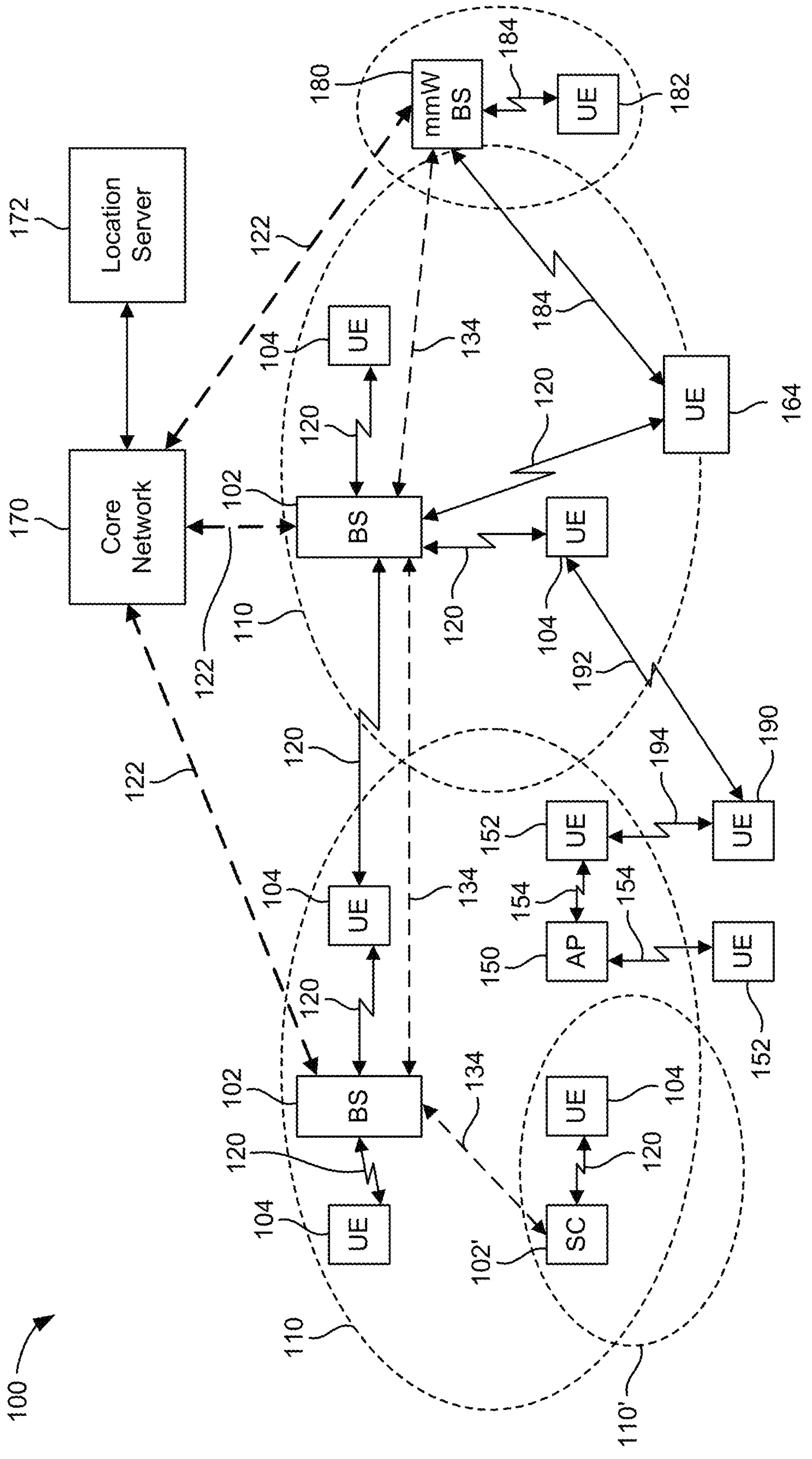
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, physical channels can correspond to sets of time-frequency resources used for transmission of particular transport channel data, control information, or indicator information. For instance, each transport channel can be mapped to a corresponding physical channel. The physical downlink shared channel (PDSCH) may carry and/or be used to communicate user data and paging information to a user equipment (UE) or other terminal. The physical downlink control channel (PDCCH) may carry and/or be used to communicate control information, including scheduling decisions for PDSCH reception, and/or for scheduling grants enabling transmission on the physical uplink shared channel (PUSCH), etc.

In 4G/LTE and 5G/NR, PDCCH and PDSCH transmissions may be associated with separate time-division multiplexing (TDM) and/or frequency-division multiplexing (FDM) resources. For instance, a first set of time-frequency resources can be used for PDCCH transmissions and a second set of time-frequency resources can be used for PDSCH transmissions, where the first and second sets are non-overlapping (e.g., a respective time-frequency resource may be included in the first set or the second set, but not both sets).

Figure 6B:
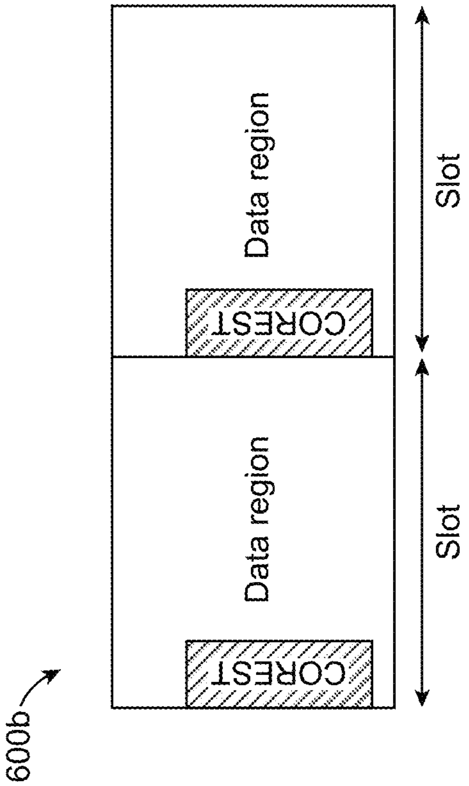
FIGS. 6A and 6B are diagrams illustrating examples of physical channels in time division multiplexing (TDM) and frequency division multiplexing (FDM) resources of a wireless network, in accordance with some examples.
Figure 6A:
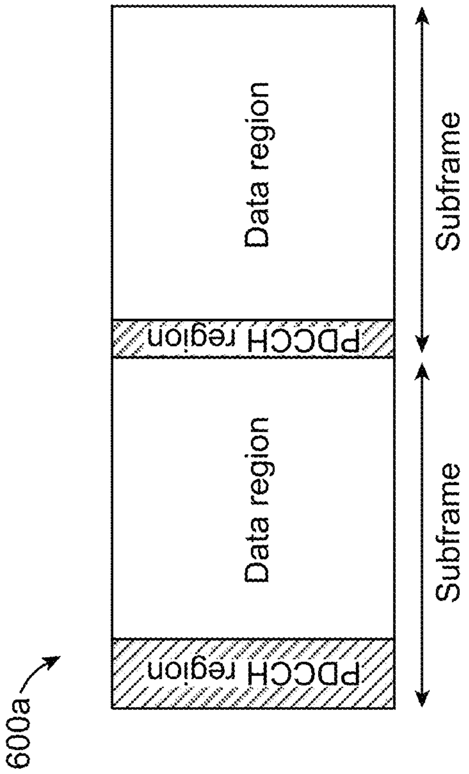

In 4G/LTE, PDCCH transmissions may occur at the beginning of a slot or subframe (e.g., TDM with PDSCH). For example, FIG. 6A is a diagram 600*a* illustrating a time-frequency resource allocation (e.g., horizontal time axis, vertical frequency axis) corresponding to two example subframes each including a PDCCH region followed by a respective data region (e.g., a respective PDSCH region). A PDCCH region may also be referred to as a "control region" and a PDSCH region may also be referred to as a "data region." In some examples, a PDCCH transmission can occupy between one to three orthogonal frequency-division multiplexing (OFDM) symbols (e.g., dynamically indicated by a physical control format indicator channel (PCFICH) transmission). In some cases, a base station (e.g., eNB, etc.) can determine or configure the amount of PDCCH resources in a slot, for example based on a respective control load associated with a PDCCH transmission in the slot.

In 5G/NR, PDCCH transmissions may utilize corresponding resources (e.g., allocated PDCCH resources) within a control resource set. The control resource set is also referred to as "CORESET," and can refer to a set of physical time-frequency resources associated with transmitting PDCCH and/or downlink control information (DCI). In 5G/NR, PDCCH transmissions utilizing CORESET resources can be implemented based on TDM and/or FDM with PDSCH transmissions. In some cases, PDSCH resource allocation is performed to avoid overlapping with the CORESET (e.g., one or more time-frequency resources allocated for PDSCH transmission(s) are different from and non-overlapping with the CORESET time-frequency resources). For example, FIG. 6B is a diagram 600*b* illustrating a time-frequency resource allocation corresponding to two example slots each including a CORESET and a data region. The data region may also be referred to as a PDSCH region (e.g., a PDSCH resource allocation). In some cases, a PDSCH resource allocation can overlap with the CORESET, for example based on rate matching around the PDCCH (e.g., within the CORESET) that carries the DL grant scheduling the PDSCH. Rate matching around the corresponding PDCCH that schedules the PDSCH can be optimized for resource allocation where the CORESET includes a single grant (e.g., the DL grant scheduling the PDSCH).

The 5G/NR spectrum resources specified in the 3GPP protocol can be separated into two different frequency ranges, Frequency Range 1 (FR1) and Frequency Range 2 (FR2). FR1 and FR2 can also be referred to as frequency range specifications. FR1 corresponds to the sub-6 Gigahertz (GHz) frequency range, and can include frequencies from 450 MHZ-6 GHz. Low and mid-band frequencies within FR1 can travel relatively long distances with better obstacle penetration (e.g., better coverage indoors, etc.) than higher-frequency bands. FR2 corresponds to frequencies from 24.25 GHz-52.60 GHz, and is also referred to as the mmWave band. FR2 may provide greater bandwidth and/or lower latency than FR1, but may also have a shorter range and lower ability to penetrate buildings and other solid obstacles.

FR1 frequency bands may utilize FDD or TDD duplex mode. FR2 frequency bands use analog beamforming (e.g., FR2 has analog beam restriction), and utilize the TDD duplex mode. For instance, the use of analog beamforming in FR2 corresponds to a low probability of different UEs to be served (e.g., with traffic) in the same analog beam. Based on the low probability, the different UEs are not served using FDM (e.g., with a single array). Instead, TDM is used to serve different UEs on the FR2 frequency bands (and/or space division multiplexing (SDM) when multiple panels or arrays are utilized). The FR2 frequency bands are additionally associated with a relatively large subcarrier spacing (SCS) and a relatively short symbol/slot duration.

The CORESET is a collection of resources (e.g., time-frequency resources) that can be shared by multiple PDCCH transmissions targeting multiple UEs. The sharing of CORESET resources for multiple PDCCH transmissions can be based on increasing control capacity and flexibility (e.g., to send DCIs to multiple UEs with different geometry and using different aggregation levels, etc.). Different UEs may additionally be associated with different channel realization information. In existing techniques, a demodulation reference signal (DMRS) is self-contained within each PDCCH transmission and precoding can be separately selected for each DCI.

The design of CORESET is optimized to support multiple UE DCI transmission (e.g., transmitting a DCI to multiple UEs), as noted above. The support multiple UE DCI transmission, the 3GPP specification provides that the PDCCH transmission carrying a DCI may also include a self-contained DMRS (e.g., allowing precoding to be separately selected for each DCI).

The optimization of the CORESET to the multiple UE DCI transmission use case corresponds to 5G/NR implementations that use FR1, as the FR2 analog beam restriction results in a very low probability for multiple UEs to be in the same analog beam. There is a need for systems and techniques that can be used to provide PDCCH/PDSCH multiplexing optimized for FR2 and/or frequencies greater than FR2. For instance, there is a need for PDCCH/PDSCH multiplexing that can be used to transmit one or more DCIs to the same UE, where shared precoding and/or beamforming can be used for the one or more DCIs and/or between the PDCCH and PDSCH.

Systems, apparatuses, processes (also referred to as methods), and computer-readable media (collectively referred to as "systems and techniques") are described herein that can be used to provide multiplexing of PDCCH and PDSCH transmissions. For instance, PDCCH and PDSCH transmissions can be integrated (e.g., multiplexed) based on a configured shared demodulation reference signal (DMRS) associated with both the PDCCH and PDSCH. In some aspects, PDCCH and PDSCH transmissions can be multiplexed based on sharing one or more time-frequency resources. For instance, a PDSCH transmission can rate match around the resources associated with a PDCCH transmission (e.g., a region of time-frequency resources is shared between control/PDCCH transmissions and data/PDSCH transmissions).

In some cases, a UE can use a configured shared DMRS for PDCCH reception and for PDSCH reception. For instance, the configured shared DMRS can be used to receive (e.g., demodulate and decode) a PDCCH or other control information indicative of a scheduled downlink data transmission. The scheduled downlink data transmission can be a PDSCH scheduled by the PDCCH. The configured shared DMRS used to receive the PDCCH can be re-used to receive the corresponding PDSCH (e.g., the PDSCH scheduled by the PDCCH).

In some examples, the UE can be configured with information associated with and/or indicative of the configured shared DMRS. The configured shared DMRS can be used to perform blind channel estimation to receive the PDCCH. As used herein, performing blind channel estimation can refer to and/or can include performing blind detection of the presence of a PDCCH corresponding to the configured shared DMRS. For instance, the presence of a PDCCH corresponding to the configured shared DMRS (or the lack/non-presence of a PDCCH corresponding to the configured shared DMRS) may be unknown prior to performing the blind detection. Based on successfully detecting a PDCCH from the blind detection, the UE can perform channel estimation corresponding to the detected PDCCH from the blind detection. Channel estimation corresponding to a detected PDCCH from a blind detection can be referred to as "blind channel estimation." corresponding channel estimation information generated from the blind channel estimation can be referred to as "blind channel estimation information." Blind channel estimation information (e.g., determined based on the blind channel estimation and using the configured shared DMRS) can be used to receive a PDCCH that includes the configured shared DMRS. Subsequently, the same blind channel estimation information and/or the same configured shared DMRS can be used to receive a PDSCH corresponding to the PDCCH (e.g., a PDSCH scheduled by a DCI/DL grant within the PDCCH).

For instance, a UE may be configured with a fixed DMRS (e.g., a pre-determined set of time/frequency domain resource elements (REs) and a corresponding sequence used) and can assume the fixed DMRS for blind channel estimation. As used herein, the "fixed DMRS" can also be referred to as the "configured shared DMRS" and vice versa. In some examples, assuming the fixed DMRS for blind channel estimation includes searching blindly for the PDCCH DMRS on the configured set of time/frequency REs and in the corresponding sequence. The UE can attempt channel estimation and PDCCH decoding based on the blind search for the PDCCH DMRS (e.g., the configured shared DMRS).

The estimated channel can be used for PDCCH demodulation and decoding (e.g., can be used to receive the PDCCH). In some cases, if a DCI (e.g., within a PDCCH) is decoded with a DL grant that covers the current DMRS, the UE can determine that the PDCCH DMRS is shared between the PDCCH and the PDSCH. The UE can reuse the channel estimation from the PDCCH DMRS for PDSCH demodulation and decoding (e.g., the DMRS is shared between the PDCCH and PDSCH). In some cases, channel estimation information determined based on a configured shared DMRS can be combined with additional channel estimation corresponding to one or more additional DMRSs (e.g., different from and/or subsequent to the configured shared DMRS).

In some aspects, multiple fixed DMRS hypotheses can be utilized (e.g., configured for a UE and/or a network entity associated with the UE). For instance, a plurality of fixed DMRS hypotheses can be configured for a UE, where each fixed DMRS hypothesis corresponds to a different set of time/frequency REs and sequence for the DMRS. In some examples, the UE can attempt channel estimation (e.g., blind channel estimation) using the multiple fixed DMRS hypotheses. In some cases, the UE can perform blind channel estimation using each DMRS hypothesis of the multiple fixed DMRS hypotheses. In some examples, the UE can implement an early stopping condition, where the UE performs blind channel estimation using different ones of the multiple fixed DMRS hypotheses until a particular one of the DMRS hypotheses is detected.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IOT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IOT) device, an energy harvesting (EH)-capable device, a network controller, an apparatus, a device, a computing system, an integrated access and backhauling (IAB) node, a DU, a CU, a RU (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 108. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, network node, apparatus, device, computing system, or the like may include disclosure of the UE, base station, network node, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IOT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
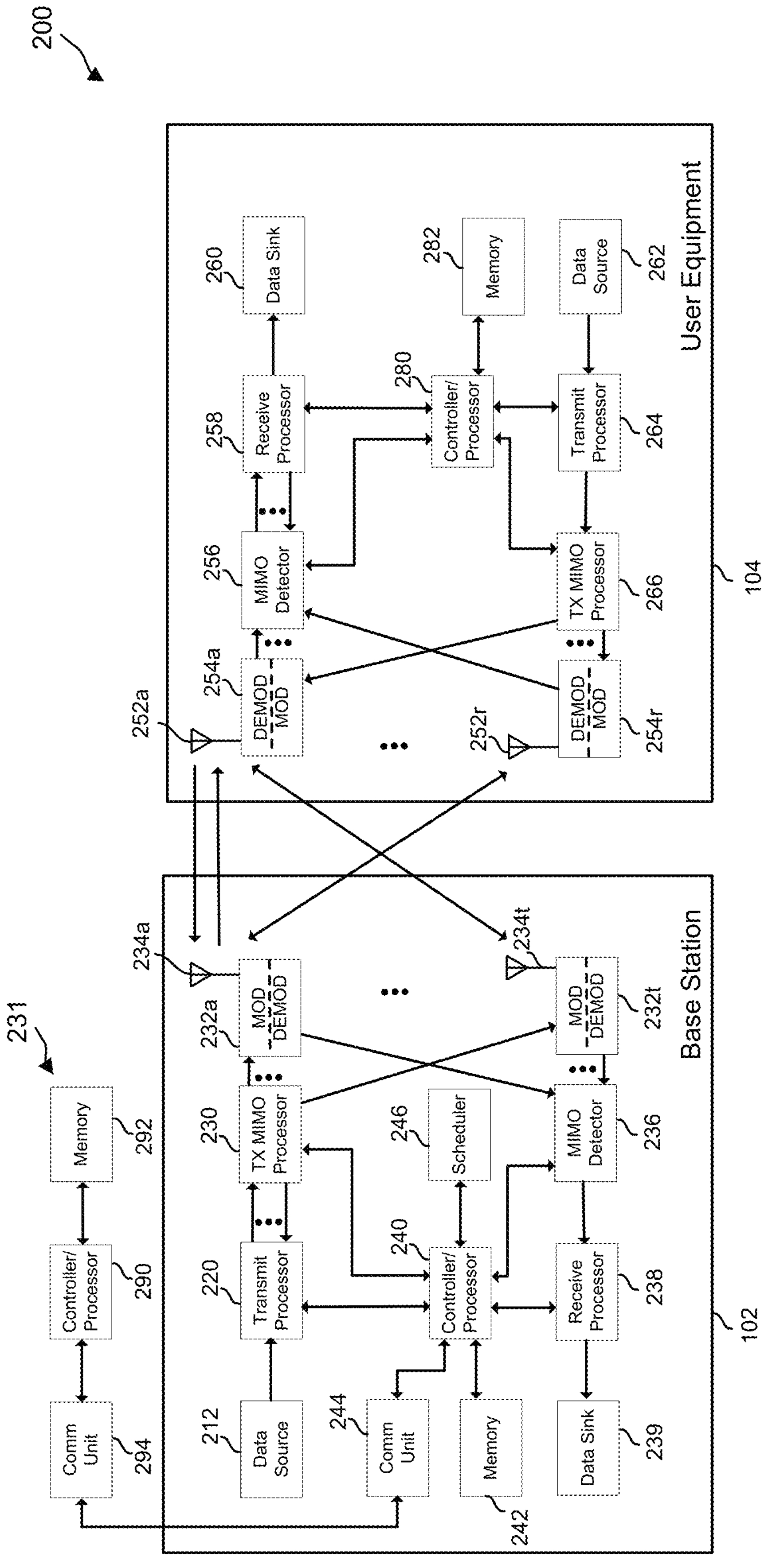
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234*a* through 234*t*, and UE 104 may be equipped with R antennas 252*a* through 252*r*, where in general $T\geq 1$ and $R\geq 1$.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream (e.g., for an orthogonal frequency-division multiplexing (OFDM) scheme and/or the like) to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to one or more demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
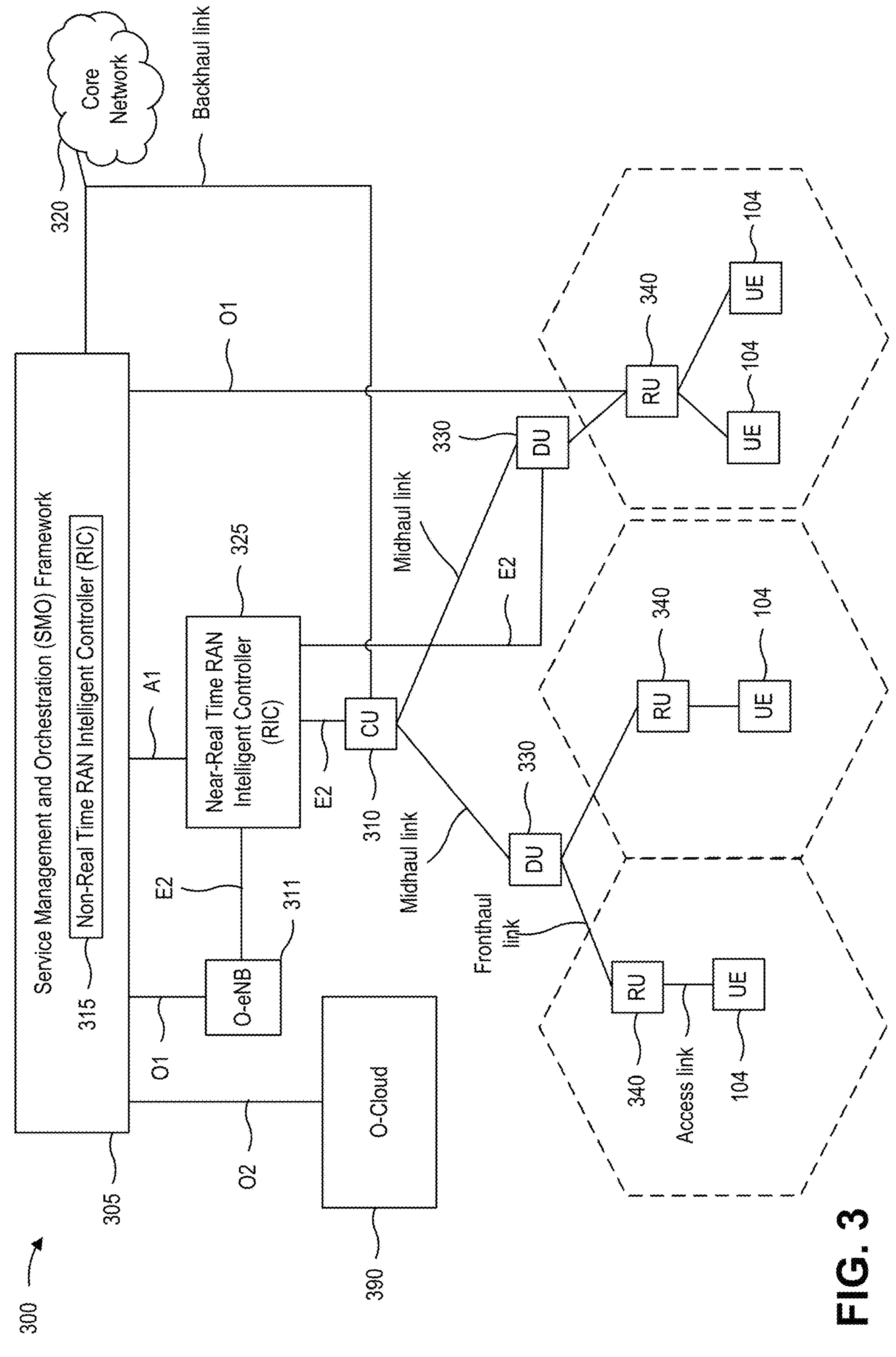
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUS 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUS 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
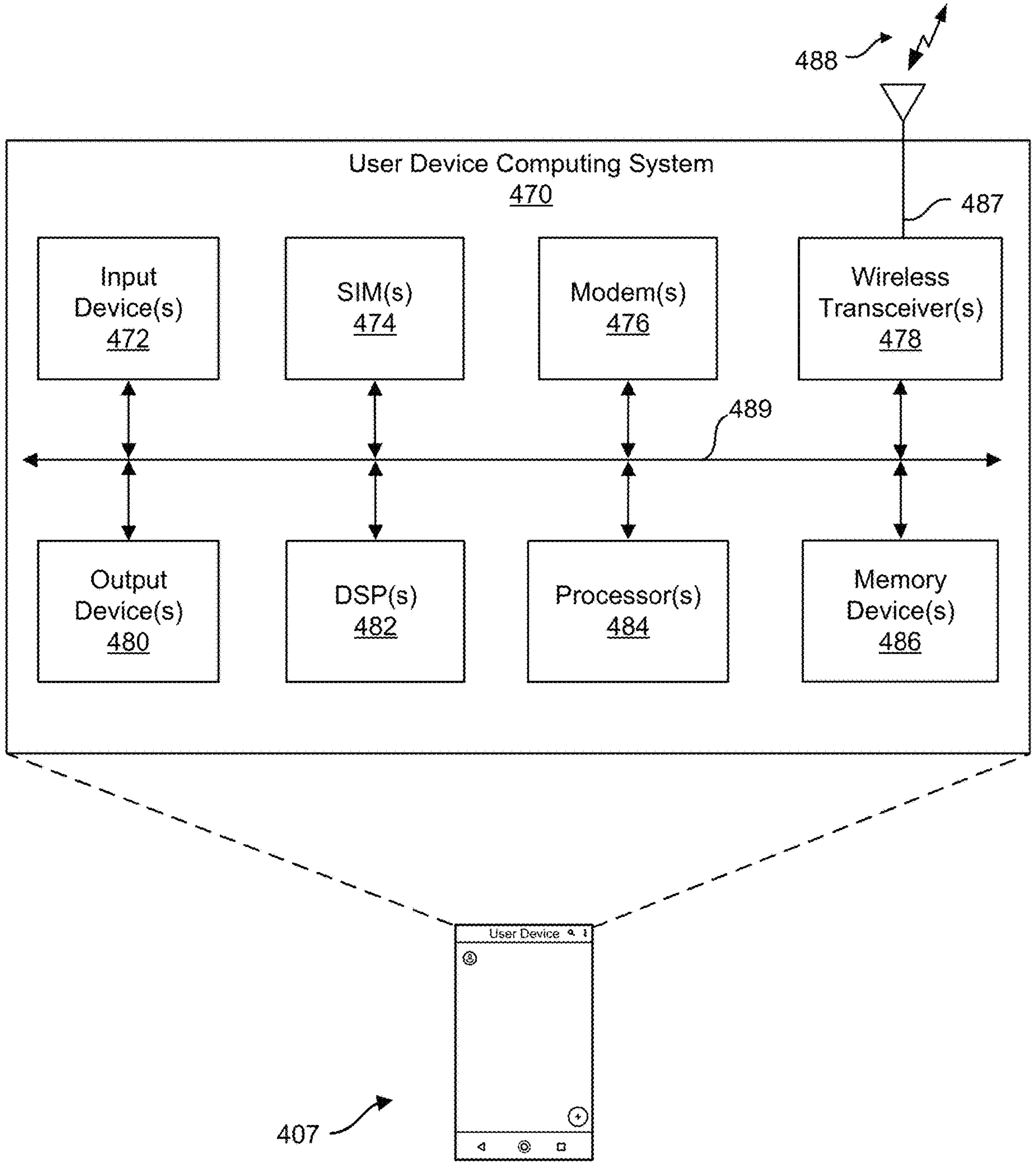
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICS, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 5:
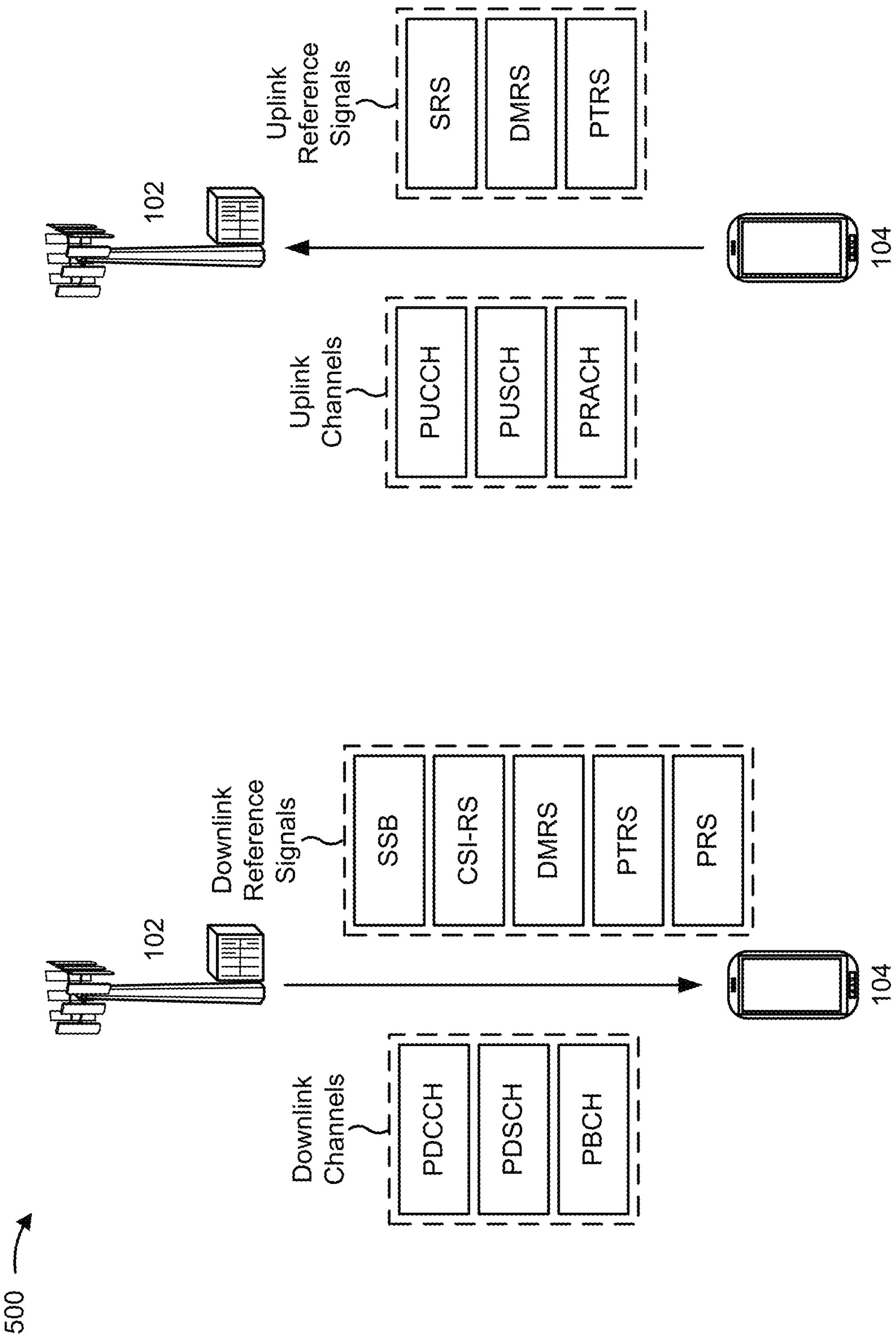
FIG. 5 is a diagram illustrating an example of physical channels and reference signals in a wireless network, in accordance with some examples.

FIG. 5 is a diagram illustrating an example 500 of physical channels and reference signals in a wireless network. In some examples, one or more downlink channels and one or more downlink reference signals may carry information from a base station 102 to a UE 104. One or more uplink channels and one or more uplink reference signals may carry information from UE 104 to base station 102.

In some aspects, a downlink channel may include one or more of a physical downlink control channel (PDCCH) that carries downlink control information (DCI), a physical downlink shared channel (PDSCH) that carries downlink data, and/or a physical broadcast channel (PBCH) that carries system information, among other examples. In some aspects, PDSCH communications may be scheduled by PDCCH communications.

In some examples, an uplink channel may include one or more of a physical uplink control channel (PUCCH) that carries uplink control information (UCI), a physical uplink shared channel (PUSCH) that carries uplink data, and/or a physical random access channel (PRACH) used for initial network access, among other examples. In some aspects, UE 104 may transmit acknowledgement (ACK) or negative acknowledgement (NACK) feedback (e.g., ACK/NACK feedback or ACK/NACK information) in UCI on the PUCCH and/or the PUSCH.

In some cases, a downlink reference signal may include one or more of a synchronization signal block (SSB), a channel state information (CSI) reference signal (CSI-RS), a demodulation reference signal (DMRS), a positioning reference signal (PRS), and/or a phase tracking reference signal (PTRS), among other examples. In some examples, an uplink reference signal may include one or more of a sounding reference signal (SRS), a DMRS, and/or a PTRS, among other examples.

An SSB may carry or include information used for initial network acquisition and synchronization. For example, an SSB can carry or include one or more of a primary synchronization signal (PSS), a secondary synchronization signal (SSS), a PBCH, and/or a PBCH DMRS. An SSB may also be referred to as a synchronization signal/PBCH (SS/PBCH) block. In some aspects, base station 102 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. For example, base station 102 can configure a set of CSI-RSs for UE 104, and UE 104 can measure the configured set of CSI-RSs. Based on the CSI-RS measurements, UE 104 can perform channel estimation and report channel estimation parameters to base station 102 (e.g., in a CSI report). For example, the channel estimation parameters can include one or more of a channel quality indicator (CQI), a precoding matrix indicator (PMI), a CSI-RS resource indicator (CRI), a layer indicator (LI), a rank indicator (RI), and/or a reference signal received power (RSRP), among other examples.

In some examples, base station 102 can use the CSI report to select transmission parameters for downlink communications to UE 104. For example, base station 102 can use the CSI report to select transmission parameters that include one or more of a quantity of transmission layers (e.g., a rank), a precoding matrix (e.g., a precoder), a modulation and coding scheme (MCS), and/or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS can carry information used to compensate for oscillator phase noise. In some cases, oscillator phase noise may increase as an oscillator carrier frequency increases. In some examples, a PTRS can be utilized at high carrier frequencies (e.g., such as millimeter wave frequencies) to mitigate oscillator phase noise. The PTRS may be used to track the phase of the local oscillator and to enable suppression of phase noise and common phase error (CPE). As illustrated in FIG. 5, in some examples one or more PTRSs can be used for both downlink communications (e.g., on the PDSCH) and uplink communications (e.g., on the PUSCH).

A PRS may carry information associated with timing or ranging measurements of UE 104. For example, UE 104 may utilize one or more signals (e.g., PRSs) transmitted by base station 102 to improve an observed time difference of arrival (OTDOA) positioning performance. In some examples, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). A PRS can be designed to improve detectability by UE 104, which may need to detect downlink signals from multiple neighboring base stations in order to perform OTDOA-based positioning. Accordingly, UE 104 may receive a PRS from multiple cells (e.g., a reference cell and one or more neighbor cells), and may report a reference signal time difference (RSTD) based on OTDOA measurements associated with the PRSs received from the multiple cells. In some aspects, base station 102 can calculate a position of UE 104 based on the RSTD measurements reported by UE 104.

In some examples, an SRS can carry information used for uplink channel estimation, which may be used for scheduling, link adaptation, precoder selection, and/or beam management, among other examples. Base station 102 can configure one or more SRS resource sets for UE 104, and UE 104 can transmit SRSs on the configured SRS resource sets. An SRS resource set may have a configured usage, such as uplink CSI acquisition, downlink CSI acquisition for reciprocity-based operations, uplink beam management, among other examples. Base station 102 may measure the SRSs, may perform channel estimation based on the measurements, and/or may use the SRS measurements to configure communications with UE 104.

As noted previously above, systems and techniques are described herein that can be used to provide PDCCH and PDSCH multiplexing using a configured shared DMRS. For example, a fixed DMRS can be used for and/or associated with a PDCCH transmission and a PDSCH transmission. The PDSCH transmission can be scheduled by the PDCCH transmission (e.g., the PDCCH transmission can include a DCI indicative of a DL grant corresponding to or associated with the PDSCH). In some cases, the systems and techniques can be used to integrate PDCCH and PDSCH transmissions for higher frequency bands, such as 5G NR FR2 (e.g., mmWave) and/or provide improved resource utilization for PDCCH and PDSCH transmission on the higher frequency bands.

Figure 7A:
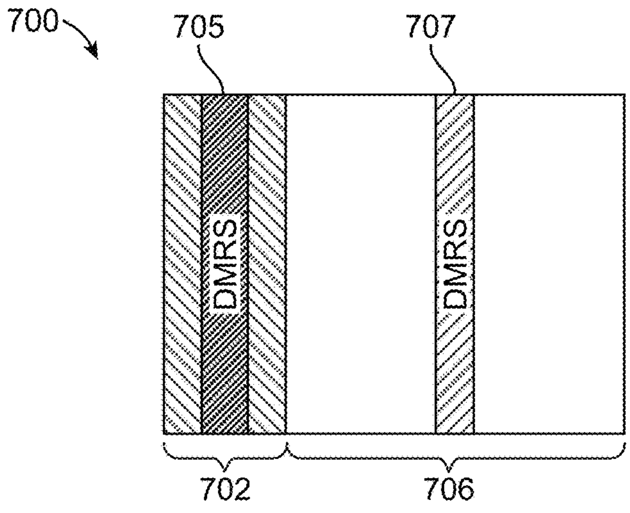
FIGS. 7A-C are diagrams illustrating examples of a configured shared DMRS associated with a physical downlink communication channel (PDCCH) and a physical downlink shared channel (PDSCH), where the configured shared DMRS and PDSCH have the same bandwidth, in accordance with some examples.
Figure 7B:
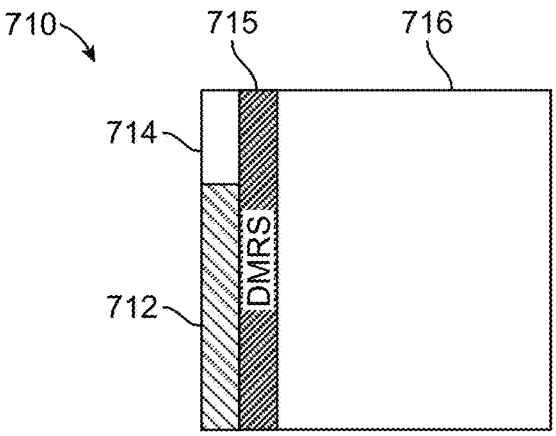
Figure 7C:
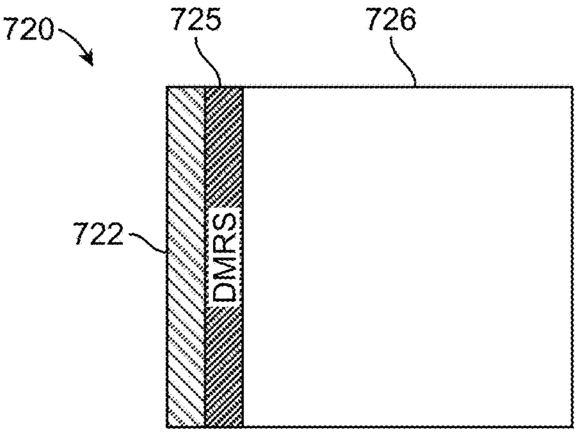

FIGS. 7A-C are diagrams illustrating respective examples of a configured shared DMRS associated with a PDCCH transmission and a PDSCH transmission. As used here, the phrase "a PDCCH" or "the PDCCH" may be used interchangeably with "a PDCCH transmission" or "the PDCCH transmission," respectively. The phrase "a PDSCH" or "the PDSCH" may be used interchangeably with "a PDSCH transmission" or "the PDSCH transmission," respectively. A PDCCH may also be referred to as "control information" and a PDSCH may also be referred to as a "scheduled downlink data transmission." For instance, a PDCCH that schedules a PDSCH can be referred to as control information indicative of a scheduled downlink data transmission.

FIGS. 7A-7C illustrate respective sets of resource elements (REs) along a horizontal time axis and a vertical frequency axis. For example, FIG. 7A illustrates a first set of time/frequency REs 700, FIG. 7B illustrates a second set of time/frequency REs 710, and FIG. 7C illustrates a third set of time/frequency REs 720. Each respective set of REs 700, 710, 720 includes a control region and a data region. For instance, the control region may correspond to a subset of REs used to transmit (e.g., by a network entity, base station, gNB, etc.) and/or receive (e.g., by a UE) control information, such as a PDCCH. The data region may correspond to a subset of REs used to transmit and/or receive data information, such as a PDSCH.

For example, the set of REs 700 of FIG. 7A includes a control region 702 and a data region 706. The set of REs 710 of FIG. 7B includes a control region 712 and a data region 716. The set of REs 720 of FIG. 7C includes a control region 722 and a data region 726. In some aspects, control region 702 and data region 706 may be non-overlapping, where a respective RE of the set of REs 700 may be included in control region 702 or may be included in data region 706, but not both.

FIGS. 7A-7C illustrate example RE allocations for multiplexed PDCCH and PDSCH transmissions using a configured shared DMRS (e.g., the configured shared DMRS 705 of FIG. 7A, the configured shared DMRS 715 of FIG. 7B, the configured shared DMRS 725 of FIG. 7C). In the examples of FIGS. 7A-7C, a bandwidth of the configured shared DMRS can be the same as a bandwidth of the potentially allocated PDSCH. For instance, the bandwidth of the control region 702, 712, 722 is the same as the bandwidth of the configured shared DMRS 705, 715, 725 (respectively) that uses a resource allocation within the control region (e.g., the configured shared DMRS can use a resource allocation within the PDCCH region, and the configured shared DMRS and associated PDCCH can have the same bandwidth). The bandwidth of the configured shared DMRS 705, 715, 725 is the same as the respective bandwidth of the data region 706, 716, 726. In one illustrative example, the systems and techniques described herein can be used to provide a shared DMRS for PDCCH and PDSCH multiplexing where the DMRS bandwidth matches (e.g., is the same as) the PDSCH bandwidth.

Figure 8A:
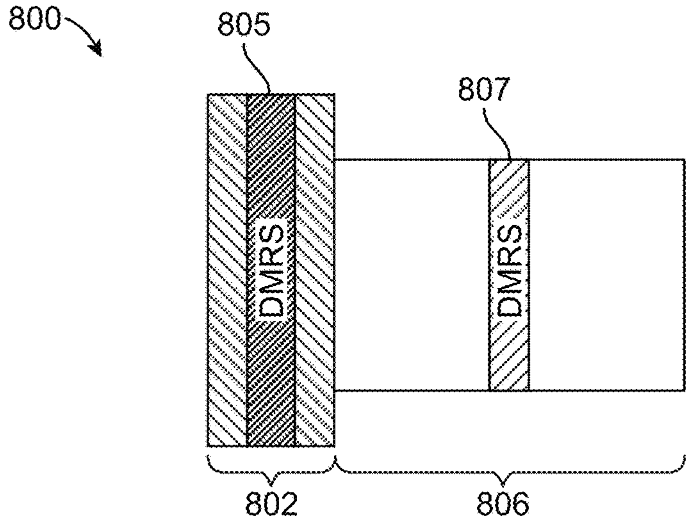
FIGS. 8A-C are diagrams illustrating examples of a configured shared DMRS associated with a PDCCH and PDSCH, where the configured shared DMRS and PDSCH have different respective bandwidths, in accordance with some examples.
Figure 8B:
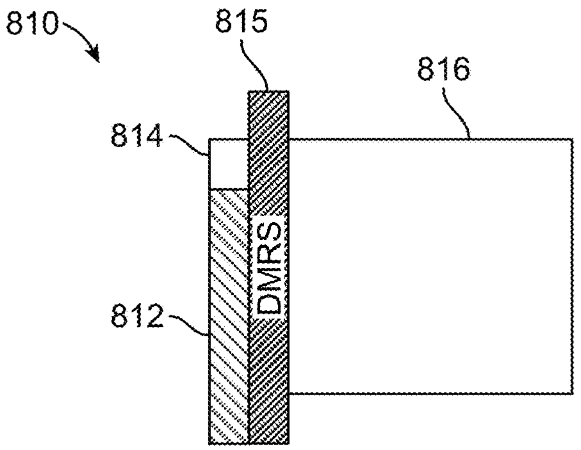
Figure 8C:
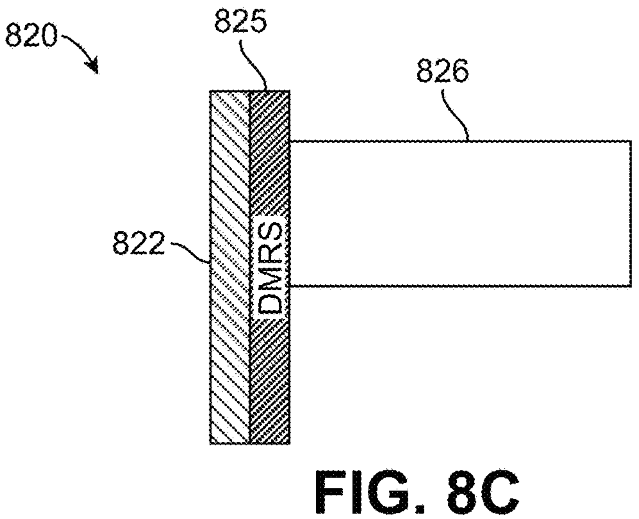

In some examples, the systems and techniques can be used to provide a shared DMRS for PDCCH and PDSCH multiplexing where the DMRS bandwidth is different from the PDSCH bandwidth. For instance, FIGS. 8A-8C illustrate example RE allocations using a configured shared DMRS associated with a greater bandwidth than a data region/potentially scheduled PDSCH associated with the configured shared DMRS. In some cases, FIGS. 8A-8C can be the same as FIGS. 7A-7C, with the respective data regions 706, 716, 726 being adjusted to the smaller bandwidth data regions 806, 816, 826 of FIGS. 8A-8C (respectively).

In some aspects, the configured shared DMRSs 705, 715, 725 of FIGS. 7A-7C (respectively) can be the same as one another. Reference is made below to the configured shared DMRS 705, but may refer to any or all of the configured shared DMRSs 705, 715, 725.

In some examples, configured shared DMRS 705 can be implemented based on a fixed and/or pre-determined combination of time-frequency domain REs. The configured shared DMRS 705 can additionally be implemented based on a fixed or pre-determined DMRS sequence (e.g., sequence of DMRS tones using some or all of the pre-predetermined combination of time-frequency REs). For instance, the configured shared DMRS 705 can correspond to a particular allocation of time-frequency resources within control region 702 of the resource grid 700, and a particular DMRS sequence using the allocated sub-set of time-frequency resources.

The configured shared DMRS 705 can be transmitted by a network entity (e.g., base station, gNB, etc.) using one or more time-frequency REs within the control region 702 of the set of REs 700. The particular combination of time-frequency REs and the DMRS sequence associated with the configured shared DMRS 705 can be configured by the network entity for a UE. For instance, the network entity can transmit (and a UE can receive) control information indicative of one or more configured shared DMRSs (e.g., such as configured shared DMRS 705).

At the beginning of a subframe or slot, a PDCCH may or may not be transmitted by a network entity. For instance, the beginning of a subframe or slot can include the control region 702 of time-frequency resources allocated and/or available for a potential PDCCH transmission (e.g., based on a scheduling decision of the network entity, gNB, base station, etc.). Because the UE is not aware of whether or not a PDCCH is transmitted, the UE can perform blind channel estimation using an assumed DMRS.

In one illustrative example, the UE can perform blind channel estimation using an assumed DMRS that is the same as the configured shared DMRS 705 (e.g., the assumed DMRS is the configured shared DMRS 705). For instance, the UE can search blindly for the configured shared DMRS 705 as a PDCCH DMRS within control region 702 of the resource grid, and can attempt to perform channel estimation and PDCCH decoding based on the blind search for configured shared DMRS 705. In the blind search and/or blind channel estimation, the UE assumes that a PDCCH DMRS is present on the control region 702 REs, and that the PDCCH DMRS will use the particular combination of time-frequency REs and DMRS sequence that correspond to configured shared DMRS 705.

Based on the blind channel estimation, the UE may detect configured shared DMRS 705 or may not detect configured shared DMRS 705. For instance, the UE may detect configured shared DMRS 705 as a PDCCH DMRS transmitted by a gNB to the UE. In some examples, the UE may not detect configured shared DMRS 705 if configured shared DMRS 705 was not transmitted by the gNB (e.g., if the gNB decides not to serve the UE, if the gNB decides to serve other UEs instead, etc.)

For instance, after determining blind channel estimation information (e.g., performing successful blind channel estimation using a fixed DMRS), the UE can proceed with PDCCH demodulation and decoding using the determined blind channel estimation information (e.g., the UE can receive the PDCCH using the determined blind channel estimation information).

To perform demodulation (e.g., of a modulated PDCCH and/or a modulated PDSCH), the UE can use the blind channel estimation information to determine the particular REs to demodulate, and a demodulation order in which to demodulate the particular REs. To perform decoding (e.g., of a demodulated PDCCH and/or a demodulated PDSCH), the UE can use the blind channel estimation information to determine the particular REs or log likelihood ratios (LLRs) for each DCI hypothesis of one or more DCI hypotheses used for decoding. The UE can additionally perform decoding based on using the blind channel estimation information o determine a payload size for the DCI hypothesis. In some cases, the UE is not aware if the blind channel estimation is valid. For instance, the UE may be unaware of whether the blind channel estimation information is valid until the UE is able to successfully decode a PDCCH or PDSCH. If the UE utilizes the blind channel estimation for a particular fixed DMRS hypothesis and PDCCH or PDSCH decoding is not successful, the UE can determine that the particular fixed DMRS hypothesis does not correspond to the current DMRS (or, if all fixed DMRS hypotheses have been attempted for blind channel estimation, the UE can determine that none of the fixed DMRS hypotheses are valid, and therefore that no DMRS was transmitted by the network entity). Prior to the decoding step, the UE does not know if the blind channel estimation information is valid, as the DMRS may not have been transmitted, or may not have been transmitted towards the UE. The UE may additionally be unaware of how many DCIs are transmitted, and/or the aggregation levels of the transmitted DCIs, etc. In some examples, blind decoding is still needed (e.g., a fixed DMRS hypothesis can be used to receive a PDCCH/PDSCH based on performing blind channel estimation information for demodulation and subsequently performing blind decoding on the demodulation result).

In one illustrative example, the DMRS sequence associated with the configured shared DMRS 705 (e.g., the DMRS sequence included in configuration information corresponding to configured shared DMRS 705) can be UE-specific. For instance, configured shared DMRS 705 can use a DMRS sequence determined based at least in part on information that is specific and/or unique to a UE that is the intended recipient for configured shared DMRS 705. In sone examples, a seed used (e.g., by a base station, gNB, etc.) to generate the DMRS sequence, to select or generate a QPSK sequence, and/or to select a Zadoff-Chu (ZC) sequence root can be a function of the UE ID.

In some aspects, the configured shared DMRS 705 can be used for various different PDCCH transmissions received by the UE. For example, configured shared DMRS 705 can be used (e.g., re-used) for each PDCCH between a base station and the UE (e.g., a first PDCCH transmission and a second PDCCH transmission can be different from one another and/or transmitted on different slots or subframes, but both the first and second PDCCH include the same configured shared DMRS 705).

In some aspects, the configured shared DMRS 705 can be re-used independent of a PDSCH transmission scheduled by the PDCCH 702. For instance, the configured shared DMRS 705 (if present within PDCCH 702) can be used without dependence on the particular PDSCH 706 scheduled by PDCCH 702. For instance, a PDSCH can be assigned or allocated various numbers of symbols, and configured shared DMRS 705 can be used to receive (e.g., demodulate and decode) the PDSCH regardless of the number of symbols assigned for the particular PDSCH. In some aspects, the configured shared DMRS 705 can be used to receive a PDSCH independent of the PDSCH start and length indicator value (SLIV), where the PDSCH SLIV is indicative of the number of symbols assigned for the PDSCH.

In some examples, the configured shared DMRS 705 can be a first DMRS within a particular set of time-frequency resources. For example, configured shared DMRS 705 can be the first DMRS within a slot or subframe corresponding to the resource grid 700. In some aspects, configured shared DMRS 705 can be the first DMRS within the particular set of time-frequency resources (e.g., resource grid 700) and may be associated with one or more additional DMRSs that are within the same particular set of time-frequency resources (e.g., resource grid 700) and are subsequent to the configured shared DMRS 705. For example, configured shared DMRS 705 can be the first DMRS in resource grid 700 and can be followed by at least one subsequent DMRS 707. The subsequent DMRS 707 can be different from the configured shared DMRS 705. For instance, configured shared DMRS 705 can be a pre-determined and fixed DMRS that uses a pre-determined combination of time-frequency resources and DMRS sequence. Subsequent DMRS 707 can be a conventional, non-fixed DMRS (e.g., a non-configured DMRS or a DMRS configured differently than configured shared DMRS 705). In some aspects, configured shared DMRS 705 is a first DMRS and is included in and/or associated with a PDCCH transmission (e.g., within PDCCH resource allocation 702) and the one or more additional, non-fixed DMRSs 707 are included in and/or associated with a PDSCH transmission (e.g., within PDSCH resource allocation 706, scheduled by a DCI or DL grant within the PDCCH transmission). In some cases, the one or more subsequent DMRSs (e.g., additional DMRS 707) can be used for receiving (e.g., demodulating and decoding) PDSCH transmissions and are not used for receiving (e.g., demodulating and decoding) PDCCH transmissions.

As noted previously above, the configured shared DMRS 705 can be configured for a UE based on configuration information transmitted from a network entity (e.g., base station, gNB, etc.) to the UE (e.g., configuration information received by the UE prior to receiving the PDCCH that includes configured shared DMRS 705).

After being configured with the corresponding configuration information for configured shared DMRS 705 (e.g., the subset of time-frequency resources within the PDCCH resource allocation 702, and the DMRS sequence for configured shared DMRS 705), the UE can assume the configured shared DMRS 705 for blind channel estimation. Blind channel estimation is used to detect the configured shared DMRS 705 within the PDCCH resource allocation 702, as the configured shared DMRS 705 may or may not be transmitted by the network entity (e.g., base station, gNB, etc.) based on a scheduling decision of the network entity. If the UE detects the configured shared DMRS 705 (e.g., if blind channel estimation assuming the configured shared DMRS 705 is successful), the UE can use the blind channel estimation information to perform PDCCH demodulation and decoding. For instance, the UE can use the blind channel estimation information corresponding to the configured shared DMRS 705 to receive a PDCCH transmission, wherein receiving the PDCCH transmission includes performing demodulation and decoding based on the blind channel estimation information.

In one illustrative example, if a DCI is decoded with a DL grant that covers the current DMRS (e.g., a DL grant that covers the configured shared DMRS 705), the UE may determine that the current DMRS (e.g., configured shared DMRS 705) is shared between the PDCCH and the PDSCH. For instance, the decoded PDCCH transmission can include a DCI that includes and/or is indicative of a DL grant that covers the configured shared DMRS 705. A DL grant covers the configured shared DMRS 705 when the PDSCH resources granted by the DL grant include the DMRS resources used by the configured shared DMRS 705.

Based on decoding a DCI (e.g., within PDCCH 702) with a DL grant that covers configured shared DMRS 705 for the scheduled PDSCH 706, the UE can re-use the channel estimation (e.g., blind channel estimation) derived based on the configured shared DMRS 705 to receive the scheduled PDSCH 706. For instance, the blind channel estimation information determined using configured shared DMRS 705 and previously used to receive (e.g., demodulate and decode) the PDCCH 702 is used to subsequently receive (e.g., demodulate and decode) the scheduled PDSCH 706. In some cases, the scheduled PDSCH 706 can be received using only the configured shared DMRS 705. In some examples, the scheduled PDSCH 706 can be received using a combination of the configured shared DMRS 705 and one or more additional DMRSs (e.g., such as the additional DMRS 707 of FIG. 7A). For instance, the scheduled PDSCH 706 can be received using channel estimation information determined using the configured shared DMRS 705 and the non-fixed DMRS 707.

In some aspects, the configuration information received by the UE (e.g., from a network entity, such as a base station, gNB, etc.) can be indicative of a single, fixed DMRS to be used for PDCCH and PDSCH multiplexing. For instance, the configuration information can be indicative of the configured shared DMRS 705 as the only fixed DMRS for PDCCH and PDSCH multiplexing.

In another illustrative example, the configuration information can be indicative of a plurality of fixed DMRSs that may be used for PDCCH and PDSCH multiplexing. For instance, the configured shared DMRS 705 can be included in and/or selected from a plurality of different configured shared DMRSs indicated by the configuration information. In some aspects, the plurality of configured shared DMRSs (e.g., fixed DMRSs) can also be referred to as DMRS hypotheses and/or fixed DMRS hypotheses. The plurality of fixed DMRS hypotheses can be pre-defined (e.g., pre-configured) at the UE. The UE can attempt channel estimation assuming each fixed DMRS hypothesis of the plurality of fixed DMRS hypotheses configured by the configuration information. For instance, the UE can perform blind channel estimation using the corresponding set of time-frequency resources and DMRS sequences configured for each respective fixed DMRS hypotheses of the plurality of configured, fixed DMRS hypotheses.

In some cases, the channel estimation assuming each of the configured, fixed DMRS hypotheses can be based on a channel estimation capability of the UE. For instance, the channel estimation assuming each of the configured, fixed DMRS hypotheses can be based on and/or similar to the control channel element (CCE) capability in the 5G NR specification (a CCE is a unit of the resources used by PDCCH to carry control information).

In some cases, the plurality of configured, fixed DMRS hypotheses can be used to provide improved flexibility at a network entity to schedule a PDSCH transmission for a UE. For instance, different PDSCH SLIVs (e.g., PDSCH transmissions using a different number of symbols) can be associated with respective different DMRS patterns. The plurality of configured, fixed DMRS hypotheses can be used to implement a corresponding configured shared DMRS for each of the different PDSCH SLIVs/symbol quantities. In some cases, using a single, fixed DMRS may limit the number of different PDSCHs that can be utilized (e.g., in some cases, using a plurality of fixed DMRS hypotheses in addition to the configured shared DMRS 705 can be associated with a larger number of different PDSCHs that can be used).

As noted previously, in some aspects the configured shared DMRS can have the same bandwidth as the corresponding scheduled PDSCH. For instance, configured shared DMRS 705 has the same bandwidth (e.g., same vertical height along the frequency axis, indicative of same number of frequency elements allocated) as the corresponding scheduled PDSCH 706 in FIG. 7A; configured shared DMRS 715 has the same bandwidth as the corresponding scheduled PDSCH 716 in FIG. 7B; configured shared DMRS 725 has the same bandwidth as the corresponding scheduled PDSCH 726 in FIG. 7C).

In another illustrative example, the configured shared DMRS can have a different bandwidth from the corresponding scheduled PDSCH. For instance, the bandwidth of the corresponding scheduled PDSCH can be less than or equal to the bandwidth of the configured shared DMRS. FIG. 8A illustrates a control region 802 that can be the same as control region 702 of FIG. 7A, and a configured shared DMRS 805 that can be the same as configured shared DMRS 705 of FIG. 7A. The corresponding scheduled PDSCH 806 can have a smaller bandwidth than the configured shared DMRS 805. FIG. 8B illustrates a control region 812 that can be the same as control region 712 of FIG. 7B, and a configured shared DMRS 815 that can be the same as configured shared DMRS 715 of FIG. 7B. The corresponding scheduled PDSCH 816 can have a smaller bandwidth than the configured shared DMRS 815. FIG. 8C illustrates a control region 822 that can be the same as control 722 of FIG. 7C, and a configured shared DMRS 825 that can be the same as the configured shared DMRS 725 of FIG. 7C. The corresponding scheduled PDSCH 826 can have a smaller bandwidth than the configured shared DMRS 825.

For instance, a fixed DMRS can be used to receive (e.g., demodulate and decode) both a PDCCH and a PDSCH (e.g., PDSCH scheduled by the PDCCH), and the PDSCH bandwidth can be smaller than the fixed DMRS bandwidth (e.g., and the fixed DMRS bandwidth may be the same as the PDCCH bandwidth).

In one illustrative example, the actual PDSCH bandwidth can be dynamically indicated in the DCI and/or DL grant within the PDCCH that schedules the PDSCH. In some cases, if a dynamic indication of the actual PDSCH bandwidth is not present or otherwise included in the DCI or DL grant scheduling the PDSCH, the UE can be configured to use a PDSCH bandwidth equal to the DMRS/PDCCH bandwidth (or various other pre-determined or configured bandwidth values).

In some aspects, a configured shared DMRS can be used to receive (e.g., demodulate and decode) a PDSCH with a smaller bandwidth than the configured shared DMRS and PDCCH, based on utilizing the portion of the (larger) configured shared DMRS bandwidth that overlaps (e.g., uses the same frequency resources, but at different time resources) with the smaller bandwidth of the scheduled PDSCH. For instance, if the bandwidth of the configured shared DMRS is wider than the scheduled PDSCH, the narrower scheduled PDSCH can be received using a corresponding subset of the wider configured shared DMRS bandwidth.

In the example of FIG. 8A, the scheduled PDSCH 806 can be received using the portion of the configured shared DMRS 805 corresponding to the frequency resources of scheduled PDSCH 806. The configured shared DMRS 805 is wider than scheduled PDSCH 806 at both the upper and lower extents of the scheduled PDSCH 806 bandwidth. The portion of the configured shared DMRS 805 bandwidth that is above the upper extent of scheduled PDSCH 806 bandwidth, and the portion of the configured shared DMRS 805 bandwidth that is below the lower extent of scheduled PDSCH 806 bandwidth are not used to receive the scheduled PDSCH 806. In some aspects, if additional DMRSs are present within the scheduled PDSCH, the respective bandwidth of the additional DMRSs can match (e.g., be the same as) the scheduled PDSCH bandwidth (e.g., narrower than the configured shared DMRS bandwidth). For instance, the additional DMRS 807 within scheduled PDSCH 806 can have the same bandwidth as the scheduled PDSCH 806. The bandwidth of the scheduled PDSCH 806 and the additional DMRS 807 can be less than (e.g., narrower than) the bandwidth of configured shared DMRS 805. In some cases, where the scheduled PDSCH 806 bandwidth is narrower than the configured shared DMRS 805 bandwidth, the PDCCH 802 can include a DCI field that is dynamically indicative of a frequency domain resource allocation (FDRA) corresponding to the scheduled PDSCH 806 and the narrower bandwidth (e.g., the FDRA indicates the frequency resources allocated, and by indicating a quantity and/or range of frequency resources that is narrower than those associated with the fixed DMRS 805 bandwidth, the DCI field dynamically indicates the narrower bandwidth allocated for the scheduled PDSCH 806).

In some examples, a PDCCH transmission can include a configured shared DMRS that uses a fixed (e.g., pre-configured and/or pre-determined) set of time-frequency resources and DMRS sequence, as described above. In one illustrative example, the PDCCH transmission can include the fixed DMRS but the UE is not served with a PDSCH (e.g., the PDCCH transmission does not schedule a PDSCH or the UE does not otherwise receive the PDSCH). For instance, in an example where only a UL grant is needed for the UE, the UE can receive a PDCCH transmission that includes a fixed DMRS without a corresponding scheduled PDSCH transmission. For example, the configured fixed DMRS can be used to receive (e.g., demodulate and decode) a PDCCH that is not associated with a corresponding scheduled PDSCH transmission. Such a PDCCH can also be referred to as a "control-only" transmission and/or a control-only PDCCH.

Figure 9A:
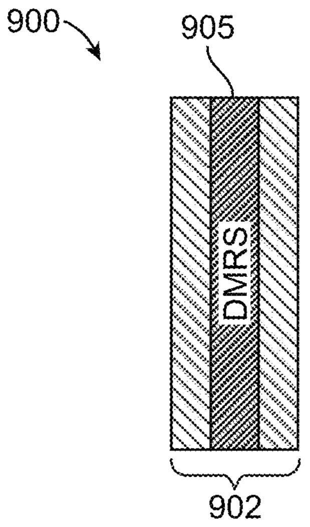
FIGS. 9A and 9B are diagrams illustrating examples of a control-only PDCCH using a configured DMRS, in accordance with some examples.

FIG. 9A is a diagram of time-frequency resources 900 associated with (e.g., allocated for) a control-only PDCCH transmission 902. The control-only PDCCH 902 includes a configured and fixed DMRS 905, without being associated with and/or scheduling a corresponding PDSCH. In some aspects, the control-only PDCCH 902 can be the same as or similar to one or more of the PDCCH 702 of FIG. 7A, the PDCCH 802 of FIG. 8A, etc. In some cases, the configured and fixed DMRS 905 can be the same as or similar to one or more of the configured shared DMRSs 705, 715, 725 of FIGS. 7A-7C (respectively) and/or one or more of the configured shared DMRSs 805, 815, 825 of FIGS. 8A-8C (respectively).

Figure 9B:
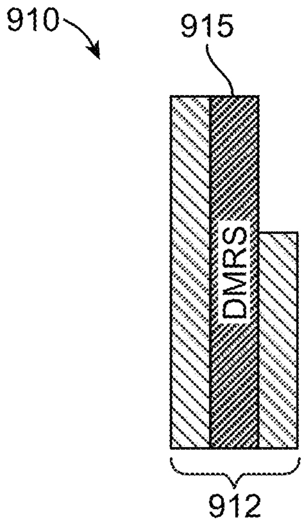

In some aspects, a control-only PDCCH transmission may utilize a subset of the symbols utilized (e.g., allocated) for the PDCCH. For instance, FIG. 9B is a diagram of time-frequency resources 910 associated with (e.g., allocated for) a control-only PDCCH transmission 912 that includes a configured and fixed DMRS 915. The configured and fixed DMRS 915 of FIG. 9B may be the same as the configured and fixed DMRS 905 of FIG. 9A. In one illustrative example, a bandwidth of the PDCCH allocation at the time resources earlier than those of the fixed DMRS 915 (e.g., the portion of PDCCH allocation 912 to the left of fixed DMRS 915 in FIG. 9B) can have a bandwidth that is the same as the bandwidth of the fixed DMRS 915 (e.g., which can be the same as the bandwidth of the PDCCH allocation 902 and fixed DMRS 905 of FIG. 9A). A bandwidth of the PDCCH allocation at the time resources later than those of the fixed DMRS 915 (e.g., the portion of PDCCH allocation 912 to the right of fixed DMRS 915 in FIG. 9B) can have a bandwidth that is smaller (e.g., narrower) than the bandwidth of the fixed DMRS 915 and the bandwidth of the earlier portion of the PDCCH allocation 912. For instance, if the PDCCH transmission does not need to use the full set of symbols allocated in the DMRS 915 bandwidth, the later portion of the PDCCH allocation 912 can leave one or more symbols (e.g., corresponding frequency resources) blank and/or unused.

In some aspects, the systems and techniques can use a configured shared DMRS (e.g., fixed DMRS associated with a pre-determined and/or pre-configured set of time-frequency REs and DMRS sequence) to multiplex one or more PDCCH to the same UE in the same packet measurement order (PMO). In some cases, the use of a single PDCCH that schedules a PDSCH is still supported in a PDCCH multiplexing implementation with a configured shared DMRS. In some cases, the quantity of PDCCHs multiplexed using the same configured shared DMRS can be based at least in part on a control channel element (CCE) limitation and/or a beamforming data/baseband data (BD) limitation.

In some examples, the systems and techniques can perform tight PDCCH and PDSCH multiplexing, for instance based on a PDSCH resource allocation that utilizes all of the time-frequency resources not utilized by the PDCCH used to schedule the PDSCH. For instance, in the example of FIG. 7B, the PDCCH 712 does not utilize the full bandwidth of frequency resources (e.g., for the time resources allocated to PDCCH 712, one or more frequency resources 714 are unused by the PDCCH 712). In this example, the PDCCH 712 bandwidth is less than the configured shared DMRS bandwidth 715 and the PDSCH 716 bandwidth. The unused portion of frequency resources 714 of the PDCCH can be allocated to and used by the scheduled PDSCH corresponding to the PDCCH and configured shared DMRS 715. In the example of FIG. 8C, an unused portion of the PDCCH 812 frequency resources can be allocated to the PDSCH 816 for tight multiplexing of the PDCCH and PDSCH. For instance, a bandwidth of the PDCCH 812 and the one or more additional frequency resources 814 (e.g., the frequency resources unused by PDCCH 812) can be less than the full bandwidth of configured shared DMRS 815, but greater than or equal to the PDSCH 816 bandwidth.

Figure 10:
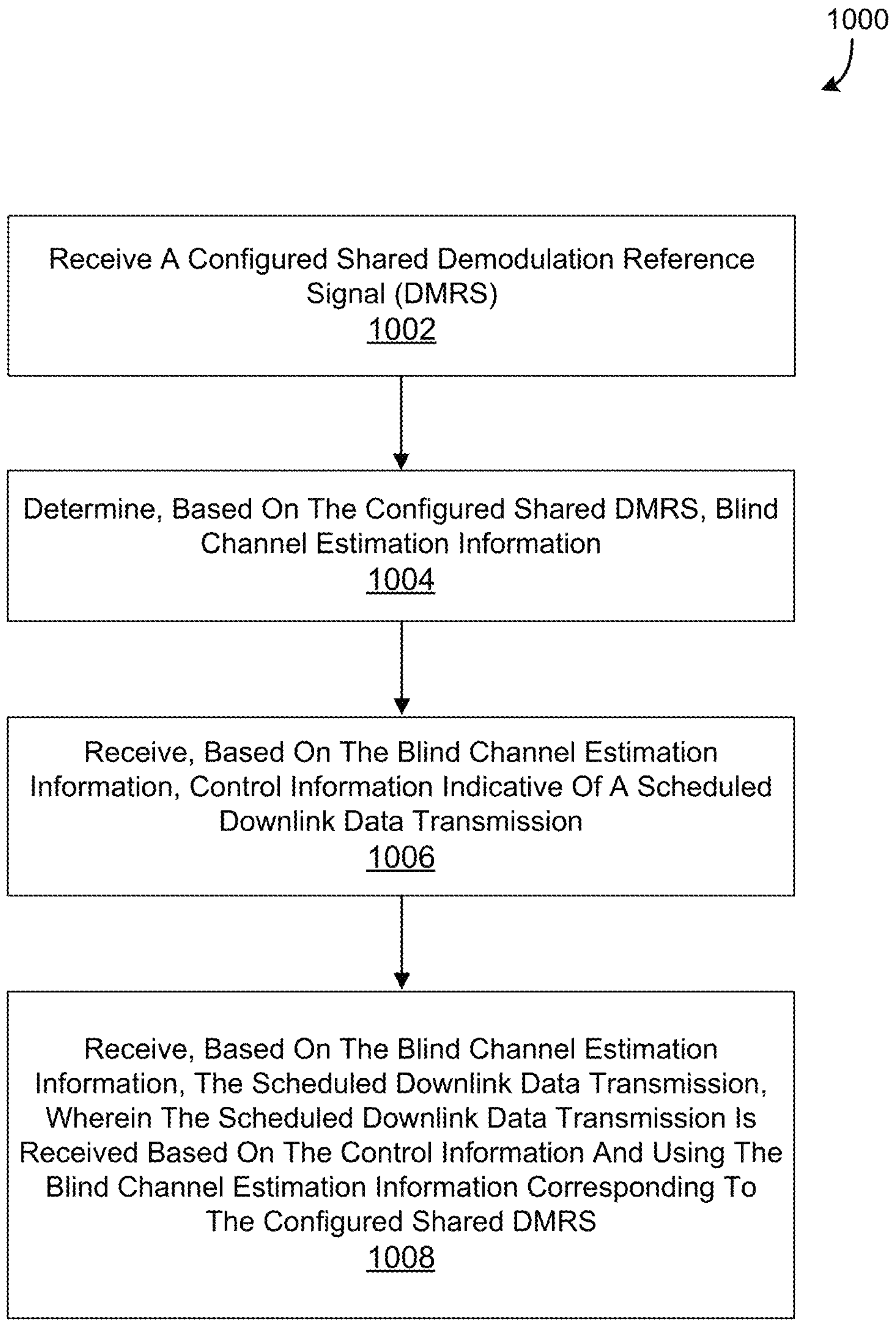
FIG. 10 is a flow diagram illustrating an example of a process for wireless communication, in accordance with some examples.

FIG. 10 is a flowchart diagram illustrating an example of a process 1000 for wireless communication. The process 1000 may be performed by a network entity or network device (or apparatus) or a component (e.g., a chipset, codec, etc.) of the network entity or device. The network entity may be a UE (e.g., the UE 104 of FIG. 1, FIG. 2, and/or FIG. 3, the wireless device 407 of FIG. 4, the UE 602 of FIG. 6, or other UE). The network entity (e.g., UE) can be a mobile device (e.g., a mobile phone), a network-connected wearable such as a watch, an extended reality (XR) device (e.g., a virtual reality (VR) device or augmented reality (AR) device), a vehicle or component or system of a vehicle, or other type of computing device configured to perform wireless communications. The operations of the process 1000 may be implemented as software components that are executed and run on one or more processors (e.g., the transmit processor 264, the receive processor 258, the TX MIMO processor 266, the MIMO detector 256 of FIG. 2, the processor(s) 484 of FIG. 4, the processor 1210 of FIG. 12, or other processor(s)). Further, the transmission and reception of signals by the network entity in the process 1000 may be enabled, for example, by one or more antennas, one or more transceivers (e.g., wireless transceiver(s)), and/or other communication components (e.g., the transmit processor 264, the receive processor 258, the TX MIMO processor 266, the MIMO detector 256, the modulator(s)/demodulator(s) 254*a* through 254*t*, and/or the antenna(es) 252*a* through 252*t* of FIG. 2, the antenna(es) 487 of FIG. 4, the wireless transceiver(s) 478 of FIG. 4, the communication interface 1240 of FIG. 12, or other antennae(s), transceiver(s), and/or component(s)).

At block 1002, the network entity (or component thereof) can receive a configured shared demodulation reference signal (DMRS). For instance, the network entity can be a user equipment (UE) and may receive the configured shared DMRS from a base station, gNB, etc. In some cases, the configured shared DMRS can be the same as or similar to one or more of the DMRS 705 of FIG. 7A; the DMRS 715 of FIG. 7B; the DMRS 725 of FIG. 7C; the DMRS 805 of FIG. 8A; the DMRS 815 of FIG. 8B; the DMRS 825 of FIG. 8C; the DMRS 905 of FIG. 9A; the DMRS 915 of FIG. 9B; etc.

In some cases, the configured shared DMRS is associated with control information and a scheduled downlink data transmission. For example, the configured shared DMRS can be associated with control information comprising a PDCCH transmission and a scheduled downlink data transmission comprising a PDSCH transmission scheduled by the PDCCH transmission. For instance, the control information can be a PDCCH transmission that is the same as or similar to one or more of PDCCH 702 of FIG. 7A; PDCCH 712 of FIG. 7B; PDCCH 722 of FIG. 7C; PDCCH 802 of FIG. 8A; PDCCH 812 of FIG. 8B; PDCCH 822 of FIG. 8C; PDCCH 902 of FIG. 9A; PDCCH 912 of FIG. 9B; etc. The scheduled downlink data transmission can be a PDSCH transmission scheduled by the PDCCH transmission. For instance, the scheduled downlink data transmission can be the same as or similar to one or more of PDSCH 706 of FIG. 7A; PDSCH 716 of FIG. 7B; PDSCH 726 of FIG. 7C; PDSCH 806 of FIG. 8A; PDSCH 816 of FIG. 8B; PDSCH 826 of FIG. 8C; etc.

In some cases, the configured shared DMRS is associated with a particular combination of time-frequency resource elements (REs) and a particular DMRS sequence. In some examples, the network entity (e.g., UE) can be configured to receive configuration information indicative of the particular combination of time-frequency REs and the particular DMRS sequence. For instance, the network entity (e.g., UE) can receive the configuration information from a base station or gNB associated with the UE.

In some examples, each physical downlink shared channel (PDSCH) Start and Length Indicator Value (SLIV) of a plurality of PDSCH SLIVs corresponds to the configured shared DMRS. For instance, each PDSCH SLIV of the plurality of PDSCH SLIVs can correspond to a different number of PDSCH symbols. In some examples, the particular DMRS sequence corresponds to a unique identifier of the network entity (e.g., a UE ID, etc.). In some cases, the network entity (e.g., UE) can search for one or more DMRS tones based on the particular combination of time-frequency REs and the particular DMRS sequence associated with the configured shared DMRS, wherein, to determine the blind channel estimation information, the network entity is configured to perform channel estimation based on one or more detected DMRS tones corresponding to the search for the one or more DMRS tones.

In some examples, the network entity (e.g., UE) can receive configuration information (e.g., from a base station, gNB, etc.) indicative of a plurality of shared DMRSs, wherein the configured shared DMRS is included in the plurality of shared DMRSs. In some cases, the network entity (e.g., UE) can perform blind channel estimation based on each respective shared DMRS of the plurality of shared DMRSs, wherein, to receive the configured shared DMRS, the network entity is configured to determine the configured shared DMRS as a selection from among the plurality of shared DMRSs. In some cases, the configuration information (e.g., received by the UE from a base station, gNB, etc.) is indicative of a corresponding physical downlink shared channel (PDSCH) Start and Length Indicator Value (SLIV) associated with each respective shared DMRS of the plurality of shared DMRSs.

At block 1004, the network entity (or component thereof) can determine, based on the configured shared DMRS, blind channel estimation information. For instance, the network entity (e.g., UE) can determine blind channel estimation information based on using the configured shared DMRS to perform blind detection of the presence of a PDCCH (e.g., the control information). The PDCCH may or may not be present, and the presence of the PDCCH may be unknown to the network entity (e.g., UE) until after performing blind detection for the PDCCH. If blind detection for the PDCCH is successful (e.g., the network entity (e.g., UE) detects a PDCCH, using the configured shared DMRS), the network entity (e.g., UE) can perform channel estimation for the PDCCH detected from the blind detection. The channel estimation information generated from performing channel estimation can be blind channel estimation information.

In some examples, the blind channel estimation information comprises channel estimation information determined using one or more detected DMRS tones corresponding to the configured shared DMRS, wherein the one or more detected DMRS tones are detected based on a blind search for DMRS tones.

At block 1006, the network entity (or component thereof) can receive, based on the blind channel estimation information, control information indicative of a scheduled downlink data transmission. For example, the control information can be a physical downlink control channel (PDCCH) transmission and the scheduled downlink data transmission can be a physical downlink shared channel (PDSCH) transmission. The PDCCH transmission and the PDSCH transmission can be received from a base station, gNB, etc., associated with the network entity (e.g., UE). In some cases, to receive the control information, the network entity (e.g., UE) is configured to demodulate and decode the PDCCH transmission based on the blind channel estimation information.

In some examples, the control information comprises a physical downlink control channel (PDCCH) transmission associated with a first set of Resource Elements (REs) and the scheduled downlink data transmission comprises a physical downlink shared channel (PDSCH) transmission scheduled by the PDCCH and associated with a second set of REs, wherein the second set of REs is adjacent to the first set of REs.

In some cases, the control information (e.g., PDCCH transmission) includes at least a first Downlink Control Information (DCI) indicative of a downlink (DL) grant corresponding to the scheduled downlink data transmission. The network entity (e.g., UE) can be configured to determine one or more resources associated with the configured shared DMRS are included in a plurality of PDSCH resources of the DL grant. To receive the scheduled downlink data transmission, the network entity (e.g., UE) can be configured to receive the scheduled downlink data transmission based on reuse of the blind channel estimation information corresponding to the configured shared DMRS.

In some cases, the control information further includes one or more additional DCIs. The one or more additional DCIs and the first DCI can be multiplexed in a physical downlink control channel (PDCCH) transmission. In some examples, a bandwidth associated with the configured shared DMRS is equal to a physical downlink shared channel (PDSCH) bandwidth associated with the scheduled downlink data transmission. In some cases, the PDSCH bandwidth associated with the scheduled downlink data transmission is equal to a physical downlink control channel (PDCCH) bandwidth associated with the control information. In some cases, a bandwidth associated with the configured shared DMRS is greater than a physical downlink shared channel (PDSCH) bandwidth associated with the scheduled downlink data transmission. In some cases, the control information includes a downlink (DL) grant indicative of the PDSCH bandwidth associated with the scheduled downlink data transmission.

At block 1008, the network entity (or component thereof) can receive, based on the blind channel estimation information, the scheduled downlink data transmission, wherein the scheduled downlink data transmission is received based on the control information and using the blind channel estimation information corresponding to the configured shared DMRS. For instance, to receive the scheduled downlink data transmission, the network entity (e.g., UE) can be configured to receive the scheduled downlink data transmission based on reuse of the blind channel estimation information determined based on the configured shared DMRS to demodulate and decode the scheduled downlink data transmission. In some examples, to receive the scheduled downlink data transmission, the network entity (e.g., UE) can be configured to demodulate and decode the PDSCH transmission based on the blind channel estimation information.

Figure 11:
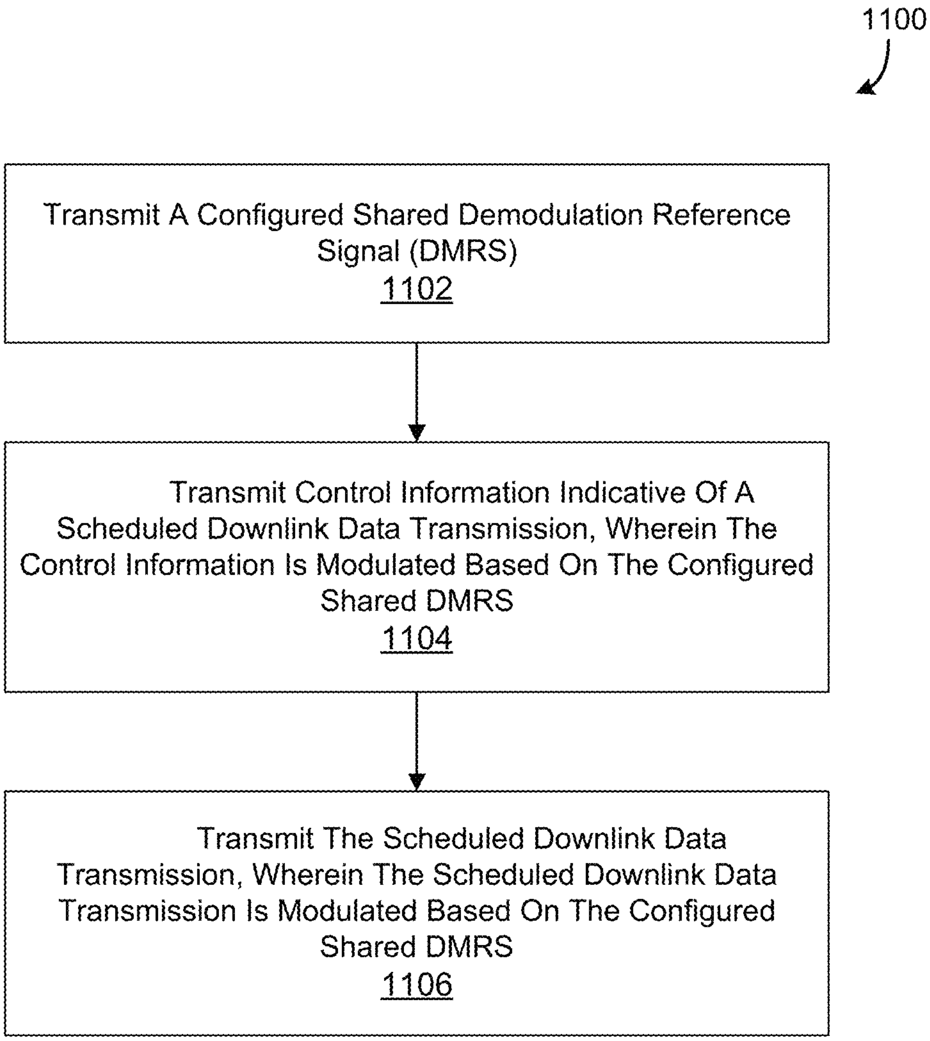
FIG. 11 is a flow diagram illustrating another example of a process for wireless communication, in accordance with some examples.

FIG. 11 is a flowchart diagram illustrating an example of a process 1100 for wireless communication. The process 1100 may be performed by a network entity or network device (or apparatus) or a component (e.g., a chipset, codec, etc.) of the network entity or device. The network entity may be a base station (e.g., an eNB, a gNB, etc.) or a portion of a base station (e.g., one or more of a CU, a DU, a RU, a Near-RT RIC, and/or a Non-RT RIC, such as the CU 310, the DU 330, the RU 340, the Near-RT RIC 325, and/or the Non-RT RIC 315 of the disaggregated base station 300 of FIG. 3), server device, or other network entity. The operations of the process 1100 may be implemented as software components that are executed and run on one or more processors (e.g., the transmit processor 220, the receive processor 238, the TX MIMO processor 230, the MIMO detector 236 of FIG. 2 and/or the processor 1210 of FIG. 12, or other processor(s)). Further, the transmission and reception of signals by the network entity in the process 1100 may be enabled, for example, by one or more antennas, one or more transceivers (e.g., wireless transceiver(s)), and/or other communication components (e.g., the transmit processor 220, the receive processor 238, the TX MIMO processor 230, the MIMO detector 236, the modulator(s)/demodulator(s) 232*a* through 232*t*, and/or the antenna(es) 234*a* through 234*t* of FIG. 2, the communication interface 1240 of FIG. 12, or other antennae(s), transceiver(s), and/or component(s)).

At block 1102, the network device (or component thereof) can transmit a configured shared demodulation reference signal (DMRS). In some cases, the configured shared DMRS can be the same as or similar to one or more of the DMRS 705 of FIG. 7A; the DMRS 715 of FIG. 7B; the DMRS 725 of FIG. 7C; the DMRS 805 of FIG. 8A; the DMRS 815 of FIG. 8B; the DMRS 825 of FIG. 8C; the DMRS 905 of FIG. 9A; the DMRS 915 of FIG. 9B; etc. In some examples, the configured shared DMRS is allocated a subset of the plurality of time-frequency resources allocated for a scheduled downlink data transmission (e.g., the configured shared DMRS can be allocated a subset of the plurality of time-frequency resources allocated for a scheduled PDSCH transmission from the network device (e.g., base station, gNB, etc.) to a user equipment (UE)).

At block 1104, the network device (or component thereof) can transmit control information indicative of a scheduled downlink data transmission, wherein the control information is modulated based on the configured shared DMRS. For instance, in some cases, the configured shared DMRS is associated with control information and a scheduled downlink data transmission.

For example, the configured shared DMRS can be associated with control information comprising a PDCCH transmission and a scheduled downlink data transmission comprising a PDSCH transmission scheduled by the PDCCH transmission. For instance, the control information can be a PDCCH transmission that is the same as or similar to one or more of PDCCH 702 of FIG. 7A; PDCCH 712 of FIG. 7B; PDCCH 722 of FIG. 7C; PDCCH 802 of FIG. 8A; PDCCH 812 of FIG. 8B; PDCCH 822 of FIG. 8C; PDCCH 902 of FIG. 9A; PDCCH 912 of FIG. 9B; etc.

The scheduled downlink data transmission can be a PDSCH transmission scheduled by the PDCCH transmission. For instance, the scheduled downlink data transmission can be the same as or similar to one or more of PDSCH 706 of FIG. 7A; PDSCH 716 of FIG. 7B; PDSCH 726 of FIG. 7C; PDSCH 806 of FIG. 8A; PDSCH 816 of FIG. 8B; PDSCH 826 of FIG. 8C; etc.

In some cases, the control information includes a downlink (DL) grant indicative of a plurality of time-frequency resources allocated for the scheduled downlink data transmission. In some examples, the control information is a physical downlink control channel (PDCCH) transmission configured for demodulation by a user equipment (UE) based on channel estimation information corresponding to the configured shared DMRS.

At block 1106, the network device (or component thereof) can transmit the scheduled downlink data transmission, wherein the scheduled downlink data transmission is modulated based on the configured shared DMRS. For example, the scheduled downlink data transmission can be a physical downlink shared channel (PDSCH) transmission configured for demodulation by the UE based on the channel estimation information corresponding to the configured shared DMRS.

In some cases, the computing device or apparatus configured to perform the process 1000 and/or the process 1100 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1000 and the process 1100 are illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1000, the process 1100, and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
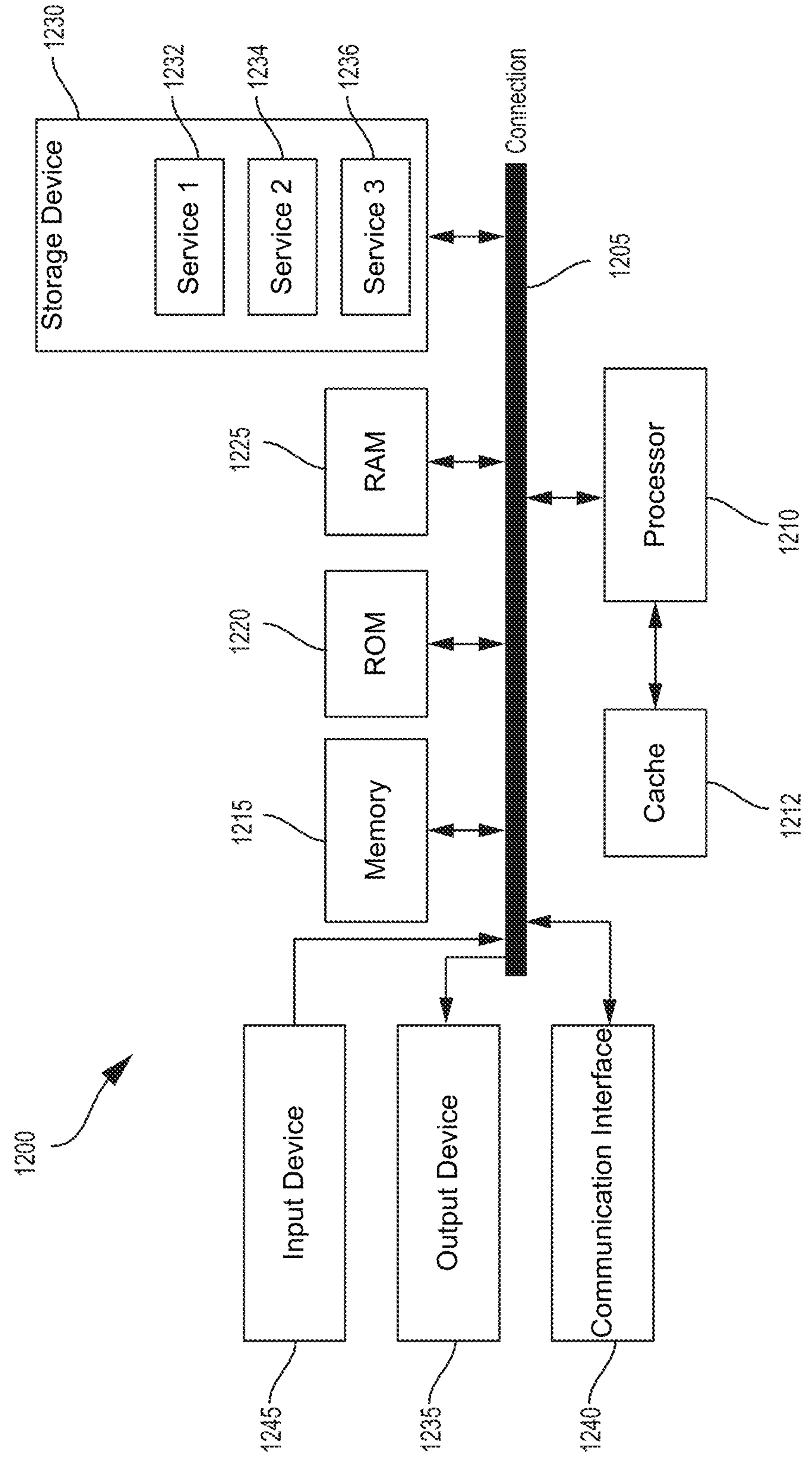
FIG. 12 is a block diagram illustrating an example of a computing system, in accordance with some examples.

FIG. 12 is a diagram illustrating an example of a system for implementing certain aspects of the present technology. In particular, FIG. 12 illustrates an example of computing system 1200, which may be for example any computing device making up internal computing system, a remote computing system, a camera, or any component thereof in which the components of the system are in communication with each other using connection 1205. Connection 1205 may be a physical connection using a bus, or a direct connection into processor 1210, such as in a chipset architecture. Connection 1205 may also be a virtual connection, networked connection, or logical connection.

In some aspects, computing system 1200 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1200 includes at least one processing unit (CPU or processor) 1210 and connection 1205 that communicatively couples various system components including system memory 1215, such as read-only memory (ROM) 1220 and random access memory (RAM) 1225 to processor 1210. Computing system 1200 may include a cache 1214 of high-speed memory connected directly with, in close proximity to, or integrated as part of processor 1210.

Processor 1210 may include any general-purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which may represent any number of input mechanisms, such as a microphone for speech, a touch-sensitive screen for gesture or graphical input, keyboard, mouse, motion input, speech, etc. Computing system 1200 may also include output device 1235, which may be one or more of a number of output mechanisms. In some instances, multimodal systems may enable a user to provide multiple types of input/output to communicate with computing system 1200.

Computing system 1200 may include communications interface 1240, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1230 may include software services, servers, services, etc., that when the code that defines such software is executed by the processor 1210, it causes the system to perform a function. In some aspects, a hardware service that performs a particular function may include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A network entity for wireless communication, comprising: at least one memory; and at least one processor coupled to the at least one memory, wherein the network entity is configured to: receive a configured shared demodulation reference signal (DMRS); determine, based on the configured shared DMRS, blind channel estimation information; receive, based on the blind channel estimation information, control information indicative of a scheduled downlink data transmission; and receive, based on the blind channel estimation information, the scheduled downlink data transmission, wherein the scheduled downlink data transmission is received based on the control information and using the blind channel estimation information corresponding to the configured shared DMRS.

Aspect 2. The network entity of Aspect 1, wherein, to receive the scheduled downlink data transmission, the network entity is configured to receive the scheduled downlink data transmission based on reuse of the blind channel estimation information determined based on the configured shared DMRS to demodulate and decode the scheduled downlink data transmission.

Aspect 3. The network entity of Aspect 2, wherein the configured shared DMRS is associated with the control information and the scheduled downlink data transmission Aspect 4. The network entity of any of Aspects 1 to 3, wherein the blind channel estimation information comprises channel estimation information determined using one or more detected DMRS tones corresponding to the configured shared DMRS, and wherein the one or more detected DMRS tones are detected based on a blind search for DMRS tones.

Aspect 5. The network entity of any of Aspects 1 to 4, wherein the control information is a physical downlink control channel (PDCCH) transmission, and wherein the scheduled downlink data transmission is a physical downlink shared channel (PDSCH) transmission.

Aspect 6. The network entity of Aspect 5, wherein, to receive the control information, the network entity is configured to: demodulate and decode the PDCCH transmission based on the blind channel estimation information.

Aspect 7. The network entity of Aspect 6, wherein, to receive the scheduled downlink data transmission, the network entity is configured to: demodulate and decode the PDSCH transmission based on the blind channel estimation information.

Aspect 8. The network entity of any of Aspects 1 to 7, wherein: the control information comprises a physical downlink control channel (PDCCH) transmission associated with a first set of Resource Elements (REs); and the scheduled downlink data transmission comprises a physical downlink shared channel (PDSCH) transmission scheduled by the PDCCH and associated with a second set of REs, wherein the second set of REs is adjacent to the first set of REs.

Aspect 9. The network entity of any of Aspects 1 to 8, wherein the control information includes at least a first Downlink Control Information (DCI) indicative of a downlink (DL) grant corresponding to the scheduled downlink data transmission.

Aspect 10. The network entity of Aspect 9, wherein the network entity is configured to: determine one or more resources associated with the configured shared DMRS are included in a plurality of PDSCH resources of the DL grant, wherein, to receive the scheduled downlink data transmission, the network entity is configured to receive the scheduled downlink data transmission based on reuse of the blind channel estimation information corresponding to the configured shared DMRS.

Aspect 11. The network entity of any of Aspects 9 to 10, wherein the control information further includes one or more additional DCIs, and wherein the one or more additional DCIs and the first DCI are multiplexed in a physical downlink control channel (PDCCH) transmission.

Aspect 12. The network entity of any of Aspects any of Aspects 1 to 11, wherein the configured shared DMRS is associated with a particular combination of time-frequency resource elements (REs) and a particular DMRS sequence.

Aspect 13. The network entity of Aspect 12, wherein the network entity is configured to: receive configuration information indicative of the particular combination of time-frequency REs and the particular DMRS sequence.

Aspect 14. The network entity of any of Aspects 12 to 13, wherein each physical downlink shared channel (PDSCH) Start and Length Indicator Value (SLIV) of a plurality of PDSCH SLIVs corresponds to the configured shared DMRS.

Aspect 15. The network entity of Aspect 14, wherein each PDSCH SLIV of the plurality of PDSCH SLIVs corresponds to a different number of PDSCH symbols.

Aspect 16. The network entity of any of Aspects 12 to 15, wherein the particular DMRS sequence corresponds to a unique identifier of the network entity.

Aspect 17. The network entity of any of Aspects 12 to 16, wherein the network entity is configured to: search for one or more DMRS tones based on the particular combination of time-frequency REs and the particular DMRS sequence associated with the configured shared DMRS, wherein, to determine the blind channel estimation information, the network entity is configured to perform channel estimation based on one or more detected DMRS tones corresponding to the search for the one or more DMRS tones.

Aspect 18. The network entity of any of Aspects 1 to 17, wherein the network entity is configured to: receive configuration information indicative of a plurality of shared DMRSs, wherein the configured shared DMRS is included in the plurality of shared DMRSs.

Aspect 19. The network entity of Aspect 18, wherein the network entity is configured to: perform blind channel estimation based on each respective shared DMRS of the plurality of shared DMRSs, wherein, to receive the configured shared DMRS, the network entity is configured to determine the configured shared DMRS as a selection from among the plurality of shared DMRSs.

Aspect 20. The network entity of any of Aspects 18 to 19, wherein: the configuration information is indicative of a corresponding physical downlink shared channel (PDSCH) Start and Length Indicator Value (SLIV) associated with each respective shared DMRS of the plurality of shared DMRSs.

Aspect 21. The network entity of any of Aspects 1 to 20, wherein a bandwidth associated with the configured shared DMRS is equal to a physical downlink shared channel (PDSCH) bandwidth associated with the scheduled downlink data transmission.

Aspect 22. The network entity of Aspect 21, wherein the PDSCH bandwidth associated with the scheduled downlink data transmission is equal to a physical downlink control channel (PDCCH) bandwidth associated with the control information.

Aspect 23. The network entity of any of Aspects 1 to 22, wherein a bandwidth associated with the configured shared DMRS is greater than a physical downlink shared channel (PDSCH) bandwidth associated with the scheduled downlink data transmission.

Aspect 24. The network entity of Aspect 23, wherein the control information includes a downlink (DL) grant indicative of the PDSCH bandwidth associated with the scheduled downlink data transmission.

Aspect 25. The network entity of any of Aspects 1 to 24, wherein the network entity is a user equipment (UE).

Aspect 26. A method for wireless communication by a network entity, comprising: receiving a configured shared demodulation reference signal (DMRS); determining, based on the configured shared DMRS, blind channel estimation information; receiving, based on the blind channel estimation information, control information indicative of a scheduled downlink data transmission; and receiving, based on the blind channel estimation information, the scheduled downlink data transmission, wherein the scheduled downlink data transmission is received based on the control information and using the blind channel estimation information corresponding to the configured shared DMRS.

Aspect 27. The method of Aspect 26, wherein receiving the scheduled downlink data transmission comprises: reusing the blind channel estimation information determined based on the configured shared DMNRS, wherein reusing the blind channel estimation information includes demodulating and decoding the scheduled downlink data transmission based on the blind channel estimation information.

Aspect 28. A network entity for wireless communication, comprising: at least one memory; and at least one processor coupled to the at least one memory, wherein the network entity is configured to: transmit a configured shared demodulation reference signal (DMRS); transmit control information indicative of a scheduled downlink data transmission, wherein the control information is modulated based on the configured shared DMRS; and transmit the scheduled downlink data transmission, wherein the scheduled downlink data transmission is modulated based on the configured shared DMRS.

Aspect 29. The network entity of Aspect 28, wherein: the control information includes a downlink (DL) grant indicative of a plurality of time-frequency resources allocated for the scheduled downlink data transmission; and the configured shared DMRS is allocated a subset of the plurality of time-frequency resources allocated for the scheduled downlink data transmission.

Aspect 30. The network entity of any of Aspects 28 to 29, wherein: the control information is a physical downlink control channel (PDCCH) transmission configured for demodulation by a user equipment (UE) based on channel estimation information corresponding to the configured shared DMRS; and the scheduled downlink data transmission is a physical downlink shared channel (PDSCH) transmission configured for demodulation by the UE based on the channel estimation information corresponding to the configured shared DMRS.

Aspect 31. A method for wireless communications comprising performing operations according to any of Aspects 1 to 25.

Aspect 32. A method for wireless communications comprising performing operations according to any of Aspects 26 to 27.

Aspect 33. A method for wireless communications comprising performing operations according to any of Aspects 28 to 30.

Aspect 34. A non-transitory computer-readable storage medium comprising instructions stored thereon which, when executed by at least one processor, causes the at least one processor to perform operations according to any of Aspects 1 to 25.

Aspect 35. A non-transitory computer-readable storage medium comprising instructions stored thereon which, when executed by at least one processor, causes the at least one processor to perform operations according to any of Aspects 26 to 27.

Aspect 36. A non-transitory computer-readable storage medium comprising instructions stored thereon which, when executed by at least one processor, causes the at least one processor to perform operations according to any of Aspects 28 to 30.

Aspect 37. An apparatus for wireless communications comprising one or more means for performing operations according to any of Aspects 1 to 25.

Aspect 38. An apparatus for wireless communications comprising one or more means for performing operations according to any of Aspects 26 to 27.

Aspect 39. An apparatus for wireless communications comprising one or more means for performing operations according to any of Aspects 28 to 30.

What is claimed is:

1. A network entity for wireless communication, comprising:

at least one memory; and at least one processor coupled to the at least one memory, wherein the network entity is configured to:

receive a configured shared demodulation reference signal (DMRS);

determine, based on the configured shared DMRS, blind channel estimation information, wherein the blind channel estimation information comprises channel estimation information determined using one or more detected DMRS tones corresponding to the configured shared DMRS, and wherein the one or more detected DMRS tones are detected based on a blind search for DMRS tones;

receive, based on the blind channel estimation information, control information indicative of a scheduled downlink data transmission; and receive, based on the blind channel estimation information, the scheduled downlink data transmission, wherein the scheduled downlink data transmission is received based on the control information and using the blind channel estimation information corresponding to the configured shared DMRS.

2. The network entity of claim 1, wherein, to receive the scheduled downlink data transmission, the network entity is configured to receive the scheduled downlink data transmission based on reuse of the blind channel estimation information determined based on the configured shared DMRS to demodulate and decode the scheduled downlink data transmission.

3. The network entity of claim 2, wherein the configured shared DMRS is associated with the control information and the scheduled downlink data transmission.

4. The network entity of claim 1, wherein the control information is a physical downlink control channel (PDCCH) transmission, and wherein the scheduled downlink data transmission is a physical downlink shared channel (PDSCH) transmission.

5. The network entity of claim 4, wherein, to receive the control information, the network entity is configured to:

demodulate and decode the PDCCH transmission based on the blind channel estimation information.

6. The network entity of claim 5, wherein, to receive the scheduled downlink data transmission, the network entity is configured to:

demodulate and decode the PDSCH transmission based on the blind channel estimation information.

7. The network entity of claim 1, wherein:

the control information comprises a physical downlink control channel (PDCCH) transmission associated with a first set of resource elements (REs); and the scheduled downlink data transmission comprises a physical downlink shared channel (PDSCH) transmission scheduled by the PDCCH and associated with a second set of REs, wherein the second set of REs is adjacent to the first set of REs.

8. The network entity of claim 1, wherein the control information includes at least first downlink control information (DCI) indicative of a downlink (DL) grant corresponding to the scheduled downlink data transmission.

9. The network entity of claim 8, wherein the control information further includes one or more additional DCIs, and wherein the one or more additional DCIs and the first DCI are multiplexed in a physical downlink control channel (PDCCH) transmission.

10. The network entity of claim 1, wherein a bandwidth associated with the configured shared DMRS is equal to a physical downlink shared channel (PDSCH) bandwidth associated with the scheduled downlink data transmission.

11. The network entity of claim 10, wherein the PDSCH bandwidth associated with the scheduled downlink data transmission is equal to a physical downlink control channel (PDCCH) bandwidth associated with the control information.

12. The network entity of claim 1, wherein the network entity is a user equipment (UE).

13. A network entity for wireless communication, comprising:

at least one memory; and at least one processor coupled to the at least one memory, wherein the network entity is configured to:

receive a configured shared demodulation reference signal (DMRS);

determine, based on the configured shared DMRS, blind channel estimation information;

receive, based on the blind channel estimation information, control information indicative of a scheduled downlink data transmission, wherein the control information includes downlink control information (DCI) indicative of a downlink (DL) grant corresponding to the scheduled downlink data transmission;

determine one or more resources associated with the configured shared DMRS are included in a plurality of PDSCH resources of the DL grant; and receive the scheduled downlink data transmission based on the control information and reuse of the blind channel estimation information corresponding to the configured shared DMRS.

14. A network entity for wireless communication, comprising:

at least one memory; and at least one processor coupled to the at least one memory, wherein the network entity is configured to:

receive a configured shared demodulation reference signal (DMRS), wherein the configured shared DMRS is associated with a particular combination of time-frequency resource elements (REs) and a particular DMRS sequence;

determine, based on the configured shared DMRS, blind channel estimation information;

receive, based on the blind channel estimation information, control information indicative of a scheduled downlink data transmission; and receive, based on the blind channel estimation information, the scheduled downlink data transmission, wherein the scheduled downlink data transmission is received based on the control information and using the blind channel estimation information corresponding to the configured shared DMRS.

15. The network entity of claim 14, wherein the network entity is configured to:

receive configuration information indicative of the particular combination of time-frequency REs and the particular DMRS sequence.

16. The network entity of claim 14, wherein each physical downlink shared channel (PDSCH) start and length indicator value (SLIV) of a plurality of PDSCH SLIVs corresponds to the configured shared DMRS.

17. The network entity of claim 16, wherein each PDSCH SLIV of the plurality of PDSCH SLIVs corresponds to a different number of PDSCH symbols.

18. The network entity of claim 14, wherein the particular DMRS sequence corresponds to a unique identifier of the network entity.

19. The network entity of claim 14, wherein the network entity is configured to:

search for one or more DMRS tones based on the particular combination of time-frequency REs and the particular DMRS sequence associated with the configured shared DMRS, wherein, to determine the blind channel estimation information, the network entity is configured to perform channel estimation based on one or more detected DMRS tones corresponding to the search for the one or more DMRS tones.

20. A network entity for wireless communication, comprising:

at least one memory; and at least one processor coupled to the at least one memory, wherein the network entity is configured to:

receive configuration information indicative of a plurality of shared DMRSs, wherein a configured shared DMRS is included in the plurality of shared DMRSs;

receive the configured shared demodulation reference signal (DMRS);

determine, based on the configured shared DMRS, blind channel estimation information;

receive, based on the blind channel estimation information, control information indicative of a scheduled downlink data transmission; and receive, based on the blind channel estimation information, the scheduled downlink data transmission, wherein the scheduled downlink data transmission is received based on the control information and using the blind channel estimation information corresponding to the configured shared DMRS.

21. The network entity of claim 20, wherein the network entity is configured to:

perform blind channel estimation based on each respective shared DMRS of the plurality of shared DMRSs, wherein, to receive the configured shared DMRS, the network entity is configured to determine the configured shared DMRS as a selection from among the plurality of shared DMRSs.

22. The network entity of claim 20, wherein:

the configuration information is indicative of a corresponding physical downlink shared channel (PDSCH)

start and length indicator value (SLIV) associated with each respective shared DMRS of the plurality of shared DMRSs.

23. A network entity for wireless communication, comprising:

at least one memory; and at least one processor coupled to the at least one memory, wherein the network entity is configured to:

receive a configured shared demodulation reference signal (DMRS);

determine, based on the configured shared DMRS, blind channel estimation information;

receive, based on the blind channel estimation information, control information indicative of a scheduled downlink data transmission; and receive, based on the blind channel estimation information, the scheduled downlink data transmission, wherein the scheduled downlink data transmission is received based on the control information and using the blind channel estimation information corresponding to the configured shared DMRS, wherein a bandwidth associated with the configured shared DMRS is greater than a physical downlink shared channel (PDSCH) bandwidth associated with the scheduled downlink data transmission.

24. The network entity of claim 23, wherein the control information includes a downlink (DL) grant indicative of the PDSCH bandwidth associated with the scheduled downlink data transmission.

* * * * *